US012307939B2

(12) United States Patent
Kobayashi et al.

(10) Patent No.: US 12,307,939 B2
(45) Date of Patent: May 20, 2025

(54) DISPLAY DEVICE

(71) Applicant: Sharp Display Technology Corporation, Kameyama (JP)

(72) Inventors: Masamitsu Kobayashi, Kameyama (JP); Takafumi Miura, Kameyama (JP)

(73) Assignee: Sharp Display Technology Corporation, Kameyama (JP)

(*) Notice: Subject to any disclaimer, the term of this patent is extended or adjusted under 35 U.S.C. 154(b) by 0 days.

(21) Appl. No.: 18/705,477

(22) PCT Filed: Dec. 29, 2021

(86) PCT No.: PCT/JP2021/049022
§ 371 (c)(1),
(2) Date: Apr. 26, 2024

(87) PCT Pub. No.: WO2023/127164
PCT Pub. Date: Jul. 6, 2023

(65) Prior Publication Data
US 2025/0014495 A1 Jan. 9, 2025

(51) Int. Cl.
*G09G 3/20* (2006.01)

(52) U.S. Cl.
CPC ... *G09G 3/2022* (2013.01); *G09G 2320/0247* (2013.01); *G09G 2320/0271* (2013.01); *G09G 2360/10* (2013.01)

(58) Field of Classification Search
CPC ......... G09G 3/2022; G09G 2320/0247; G09G 2320/0261; G09G 2320/0271; G09G 2340/0435; G09G 2360/10
See application file for complete search history.

(56) References Cited

U.S. PATENT DOCUMENTS

| | | | | |
|---|---|---|---|---|
| 8,150,198 B2 * | 4/2012 | Kubo | G09G 3/2011 | 382/264 |
| 8,223,098 B2 * | 7/2012 | Ishihara | G09G 3/3611 | 345/87 |

(Continued)

FOREIGN PATENT DOCUMENTS

| | | |
|---|---|---|
| JP | 2005-173574 A | 6/2005 |
| JP | 4525064 B2 * | 8/2010 |

(Continued)

*Primary Examiner* — Joe H Cheng
(74) *Attorney, Agent, or Firm* — ScienBiziP, P.C.

(57) ABSTRACT

A display device is configured to divide one frame into a first-half sub-frame and a second-half sub-frame and display an image in each of the first-half sub-frame and the second-half sub-frame. The display device includes a pixel-of-interest specifying unit, a first peripheral pixel specifying unit, a first difference coefficient determination unit, a first coefficient determination unit, a first pixel value determination unit, a second peripheral pixel specifying unit, a second difference coefficient determination unit, a second coefficient determination unit, and a second pixel value determination unit. As a first coefficient and a second coefficient equal to each other are larger, a difference between an output pixel value corresponding to an input pixel value in a first conversion data and an output pixel value corresponding to the identical input pixel value in a second conversion data is larger.

5 Claims, 24 Drawing Sheets

(56) References Cited

U.S. PATENT DOCUMENTS

| | | | | |
|---|---|---|---|---|
| 8,373,777 | B2 * | 2/2013 | Sasaki | H04N 5/145 348/241 |
| 9,024,852 | B2 * | 5/2015 | Ishihara | G09G 3/3611 345/87 |
| 9,667,938 | B2 * | 5/2017 | Izawa | H04N 25/704 |
| 2004/0257325 | A1 * | 12/2004 | Inoue | G09G 3/3648 345/89 |
| 2006/0170658 | A1 * | 8/2006 | Nakamura | G06F 3/0412 345/173 |
| 2006/0197732 | A1 * | 9/2006 | Oyaizu | G09G 3/2022 345/99 |
| 2008/0180424 | A1 | 7/2008 | Ishihara | |
| 2013/0057772 | A1 | 3/2013 | Ishihara | |

FOREIGN PATENT DOCUMENTS

| | | | |
|---|---|---|---|
| JP | 2019101189 | A * | 6/2019 |
| WO | 2007/052441 | A1 | 5/2007 |

* cited by examiner

| | X1 | X2 | X3 | X4 | X5 | ・・・ |
|---|---|---|---|---|---|---|
| (n-1)-th FRAME | I1 (n−1) | I2 (n−1) | I3 (n−1) | I4 (n−1) | I5 (n−1) | ・・・ |
| n-th FRAME | I1 (n) | I2 (n) | I3 (n) | I4 (n) | I5 (n) | ・・・ |
| (n+1)-th FRAME | I1 (n+1) | I2 (n+1) | I3 (n+1) | I4 (n+1) | I5 (n+1) | ・・・ |

FIG. 2

| | X1 | X2 | X3 | X4 | X5 | · · · |
|---|---|---|---|---|---|---|
| (n-1)-th FIRST-HALF SUB-FRAME | F1 (n−1) | F2 (n−1) | F3 (n−1) | F4 (n−1) | F5 (n−1) | · · · |
| (n-1)-th SECOND-HALF SUB-FRAME | S1 (n−1) | S2 (n−1) | S3 (n−1) | S4 (n−1) | S5 (n−1) | · · · |
| n-th FIRST-HALF SUB-FRAME | F1 (n) | F2 (n) | F3 (n) | F4 (n) | F5 (n) | · · · |
| n-th SECOND-HALF SUB-FRAME | S1 (n) | S2 (n) | S3 (n) | S4 (n) | S5 (n) | · · · |
| (n+1)-th FIRST-HALF SUB-FRAME | F1 (n+1) | F2 (n+1) | F3 (n+1) | F4 (n+1) | F5 (n+1) | · · · |
| (n+1)-th SECOND-HALF SUB-FRAME | S1 (n+1) | S2 (n+1) | S3 (n+1) | S4 (n+1) | S5 (n+1) | · · · |

FIG. 3

| | X1 | X2 | X3 | X4 | X5 | X6 | X7 | X8 | X9 | X10 | X11 | X12 | X13 | X14 | X15 | X16 | X17 | X18 | X19 | X20 |
|---|---|---|---|---|---|---|---|---|---|---|---|---|---|---|---|---|---|---|---|---|
| (n-1)-th FIRST-HALF SUB-FRAME | 0.25 | 0.25 | 0.25 | 0.25 | 0.25 | 0.25 | 0.25 | 0.25 | 0.25 | 0.25 | 0.25 | 0.2 | 0.1 | 0 | 0 | 0 | 0 | 0.2 | 0.4 | 0.5 |
| (n-1)-th SECOND-HALF SUB-FRAME | 0.25 | 0.25 | 0.25 | 0.25 | 0.25 | 0.25 | 0.25 | 0.25 | 0.25 | 0.3 | 0.4 | 0.5 | 0.5 | 0.5 | 0.5 | 0.8 | 0.6 | 0.5 | 0.5 | 0.5 |
| n-th FIRST-HALF SUB-FRAME | 0.25 | 0.25 | 0.25 | 0.25 | 0.25 | 0.25 | 0.25 | 0.2 | 0.1 | 0 | 0 | 0 | 0 | 0.2 | 0.4 | 0.5 | 0.5 | 0.5 | 0.5 | 0.5 |
| n-th SECOND-HALF SUB-FRAME | 0.25 | 0.25 | 0.25 | 0.25 | 0.25 | 0.3 | 0.4 | 0.5 | 0.5 | 0.5 | 0.5 | 0.8 | 0.6 | 0.5 | 0.5 | 0.5 | 0.5 | 0.5 | 0.5 | 0.5 |
| (n+1)-th FIRST-HALF SUB-FRAME | 0.25 | 0.25 | 0.25 | 0.2 | 0.1 | 0 | 0 | 0 | 0 | 0.2 | 0.4 | 0.5 | 0.5 | 0.5 | 0.5 | 0.5 | 0.5 | 0.5 | 0.5 | 0.5 |
| (n+1)-th SECOND-HALF SUB-FRAME | 0.25 | 0.3 | 0.4 | 0.5 | 0.5 | 0.5 | 0.5 | 0.8 | 0.6 | 0.5 | 0.5 | 0.5 | 0.5 | 0.5 | 0.5 | 0.5 | 0.5 | 0.5 | 0.5 | 0.5 |

FIG. 7

31

| | | | | | | | | |
|---|---|---|---|---|---|---|---|---|
| 4 | 8 | 8 | 8 | 8 | 8 | 8 | 8 | 4 |
| 8 | 16 | 16 | 16 | 16 | 16 | 16 | 16 | 8 |
| 8 | 16 | 16 | 16 | 16 | 16 | 16 | 16 | 8 |
| 8 | 16 | 16 | 16 | 16 | 16 | 16 | 16 | 8 |
| 8 | 16 | 16 | 16 | 16 | 16 | 16 | 16 | 8 |
| 8 | 16 | 16 | 16 | 16 | 16 | 16 | 16 | 8 |
| 8 | 16 | 16 | 16 | 16 | 16 | 16 | 16 | 8 |
| 8 | 16 | 16 | 16 | 16 | 16 | 16 | 16 | 8 |
| 4 | 8 | 8 | 8 | 8 | 8 | 8 | 8 | 4 |

FIG. 8

| | B13 | B23 | B33 | B43 | B53 |
|---|---|---|---|---|---|
| | X10 | X11 | X12 | X13 | X14 |
| n-th FRAME | 0.25 | 0.25 | 0.5 | 0.5 | 0.5 |
| (n+1)-th FRAME | 0.5 | 0.5 | 0.5 | 0.5 | 0.5 |

FIG. 11

| | X1 | X2 | X3 | X4 | X5 | X6 | X7 | X8 | X9 | X10 | X11 | X12 | X13 | X14 | X15 | X16 | X17 | X18 | X19 | X20 |
|---|---|---|---|---|---|---|---|---|---|---|---|---|---|---|---|---|---|---|---|---|
| (n-1)-th FIRST-HALF SUB-FRAME | 0 | 0 | 0 | 0 | 0 | 0 | 0 | 0 | 0 | 0 | 0 | 0.2 | 0.6 | 1 | 1 | 1 | 1 | 0.6 | 0.2 | 0 |
| (n-1)-th SECOND-HALF SUB-FRAME | 0 | 0 | 0 | 0 | 0 | 0 | 0 | 0 | 0 | 0.2 | 0.6 | 1 | 1 | 1 | 1 | 0.6 | 0.2 | 0 | 0 | 0 |
| n-th FIRST-HALF SUB-FRAME | 0 | 0 | 0 | 0 | 0 | 0 | 0 | 0.2 | 0.6 | 1 | 1 | 1 | 1 | 0.6 | 0.2 | 0 | 0 | 0 | 0 | 0 |
| n-th SECOND-HALF SUB-FRAME | 0 | 0 | 0 | 0 | 0 | 0.2 | 0.6 | 1 | 1 | 1 | 1 | 0.6 | 0.2 | 0 | 0 | 0 | 0 | 0 | 0 | 0 |

FIG. 13

| | X1 | X2 | X3 | X4 | X5 | X6 | X7 | X8 | X9 | X10 | X11 | X12 | X13 | X14 | X15 | X16 | X17 | X18 | X19 | X20 |
|---|---|---|---|---|---|---|---|---|---|---|---|---|---|---|---|---|---|---|---|---|
| (n-1)-th FIRST-HALF SUB-FRAME | 0.25 | 0.25 | 0.25 | 0.25 | 0.25 | 0.25 | 0.25 | 0.25 | 0.25 | 0.25 | 0.25 | 0.3 | 0.4 | 0.5 | 0.5 | 1 | 1 | 0.8 | 0.6 | 0.5 |
| (n-1)-th SECOND-HALF SUB-FRAME | 0.25 | 0.25 | 0.25 | 0.25 | 0.25 | 0.25 | 0.25 | 0.25 | 0.25 | 0.2 | 0.1 | 0 | 0 | 0 | 0 | 0.2 | 0.4 | 0.5 | 0.5 | 0.5 |
| n-th FIRST-HALF SUB-FRAME | 0.25 | 0.25 | 0.25 | 0.25 | 0.25 | 0.25 | 0.25 | 0.3 | 0.4 | 0.5 | 0.6 | 1 | 1 | 0.8 | 0.6 | 0.5 | 0.5 | 0.5 | 0.5 | 0.5 |
| n-th SECOND-HALF SUB-FRAME | 0.25 | 0.25 | 0.25 | 0.25 | 0.25 | 0.2 | 0.1 | 0 | 0 | 0 | 0 | 0.2 | 0.4 | 0.5 | 0.5 | 0.5 | 0.5 | 0.5 | 0.5 | 0.5 |
| (n+1)-th FIRST-HALF SUB-FRAME | 0.25 | 0.25 | 0.25 | 0.3 | 0.4 | 0.5 | 0.5 | 1 | 1 | 0.8 | 0.6 | 0.5 | 0.5 | 0.5 | 0.5 | 0.5 | 0.5 | 0.5 | 0.5 | 0.5 |
| (n+1)-th SECOND-HALF SUB-FRAME | 0.25 | 0.2 | 0.1 | 0 | 0 | 0 | 0 | 0.2 | 0.4 | 0.5 | 0.5 | 0.5 | 0.5 | 0.5 | 0.5 | 0.5 | 0.5 | 0.5 | 0.5 | 0.5 |
| VISUAL RECOGNITION BY USER | 0.25 | 0.25 | 0.25 | 0.25 | 0.38 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |

FIG. 22

DISPLAY DEVICE

This application is the National Stage of PCT/JP2021/049022 filed on Dec. 29, 2021, the disclosure of which is incorporated by reference.

TECHNICAL FIELD

The disclosure described below relates to a display device.

BACKGROUND ART

PTL 1 discloses an image display device in which one frame period is divided into a plurality of sub-frame periods, a gray scale level of each sub-frame is determined in accordance with a gray scale level of an input image signal, and the determined gray scale level is supplied to an image display portion to display an image. The image display device includes a display controller that supplies a large gray scale level in order from a sub-frame at a temporal center or in the vicinity of the temporal center of the one frame period. According to PTL 1, it is possible to suppress a motion blur that occurs when a moving picture is displayed in a hold-type image display device while suppressing a decrease in maximum luminance and contrast.

PTL 2 discloses an image display device. In this image display device, one frame is divided into a plurality of sub-frame periods, and when an image of one frame is input in which a region displayed by a certain image signal a or displayed by an image signal close to the image signal a is adjacent to a region displayed by another image signal R or displayed by an image signal close to the image signal 3, in the vicinity of a boundary line between the region of the image signal a and the region of the image signal 3, the image signal is changed to an image signal in such a manner that a difference from an image signal of the other region is lessened and image display is performed in at least one sub-frame period A, and the image signal is changed to an image signal in such a manner that a difference from an image signal of the other region is emphasized and image display is performed in at least another one sub-frame period B. According to PTL 2, moving picture quality of a hold-type display device can be improved without a decrease in luminance and occurrence of a flicker in the image display device.

CITATION LIST

Patent Literature

PTL 1: JP 2005-173574 A
PTL 2: WO 2007/052441

SUMMARY

Technical Problem

In the techniques of PTL 1 and PTL 2, there is room for further improvement in display quality of moving pictures.

An object of an aspect of the disclosure is to further improve the display quality of moving pictures.

Solution to Problem

In order to solve the above-mentioned problem, a display device according to an aspect of the disclosure is a display device configured to divide one frame into a first-half sub-frame and a second-half sub-frame and display an image in each of the first-half sub-frame and the second-half sub-frame, the display device including:

a pixel-of-interest specifying unit configured to specify, as a pixel of interest, any one of a plurality of pixels constituting an image of the one frame;

a first peripheral pixel specifying unit configured to specify a plurality of first peripheral pixels disposed in a periphery of the pixel of interest in the image;

a first difference coefficient determination unit configured to determine a plurality of first difference coefficients based on differences between each pixel value of the pixel of interest and the plurality of first peripheral pixels in the image of the one frame and a pixel value of the pixel of interest in the image of the one frame;

a first coefficient determination unit configured to determine a first coefficient by performing an arithmetic operation using a first filter on each of the plurality of first difference coefficients;

a first pixel value determination unit configured to determine a pixel value of the pixel of interest in an image of the first-half sub-frame based on first conversion data defining correspondence between an input pixel value and the first coefficient, and an output pixel value;

a second peripheral pixel specifying unit configured to specify a plurality of second peripheral pixels disposed in the periphery of the pixel of interest in the image mentioned above;

a second difference coefficient determination unit configured to determine a plurality of second difference coefficients based on differences between each pixel value of the pixel of interest and the plurality of second peripheral pixels in an image of a frame subsequent to the one frame, and each pixel value of the pixel of interest and the plurality of second peripheral pixels in the image of the one frame;

a second coefficient determination unit configured to determine a second coefficient by performing an arithmetic operation using a second filter on each of the plurality of second difference coefficients; and a second pixel value determination unit configured to determine a pixel value of the pixel of interest in an image of the second-half sub-frame based on second conversion data defining correspondence between an input pixel value and the second coefficient, and an output pixel value, wherein as the first coefficient and the second coefficient equal to each other are larger, a difference between the output pixel value corresponding to the input pixel value in the first conversion data and the output pixel value corresponding to the identical input pixel value in the second conversion data is larger.

Advantageous Effects of Disclosure

According to an aspect of the disclosure, the display quality of moving pictures may be further improved.

BRIEF DESCRIPTION OF DRAWINGS

FIG. 2 is a diagram depicting names of luminance levels of pixels in images of three frames constituting input image data in an embodiment of the disclosure.

FIG. 3 is a diagram depicting names of luminance levels of pixels in images of six sub-frames constituting output image data in an embodiment of the disclosure.

FIG. 7 is a diagram depicting actual luminance levels of pixels in images of six sub-frames constituting display data after conversion in an embodiment of the disclosure.

FIG. 8 is a diagram depicting a specific example of each filter value included in a filter in an embodiment of the disclosure.

FIG. 11 is a diagram depicting luminance levels of a predetermined number of pixels in an n-th frame and luminance levels of a predetermined number of pixels in an (n+1)-th frame, which are used to determine a luminance level of a pixel in an n-th second-half sub-frame.

FIG. 13 is a diagram depicting a value of a first-half sub-frame coefficient and a value of a second-half sub-frame coefficient determined for each pixel in each sub-frame.

FIG. 22 is a diagram depicting actual luminance levels of pixels in images of six sub-frames constituting display data after conversion and luminance levels of pixels visually recognized by a user when the image is driven at double speed and displayed in a modified example of the disclosure.

DESCRIPTION OF EMBODIMENTS

Configuration of Display Device 1

Figure 1:
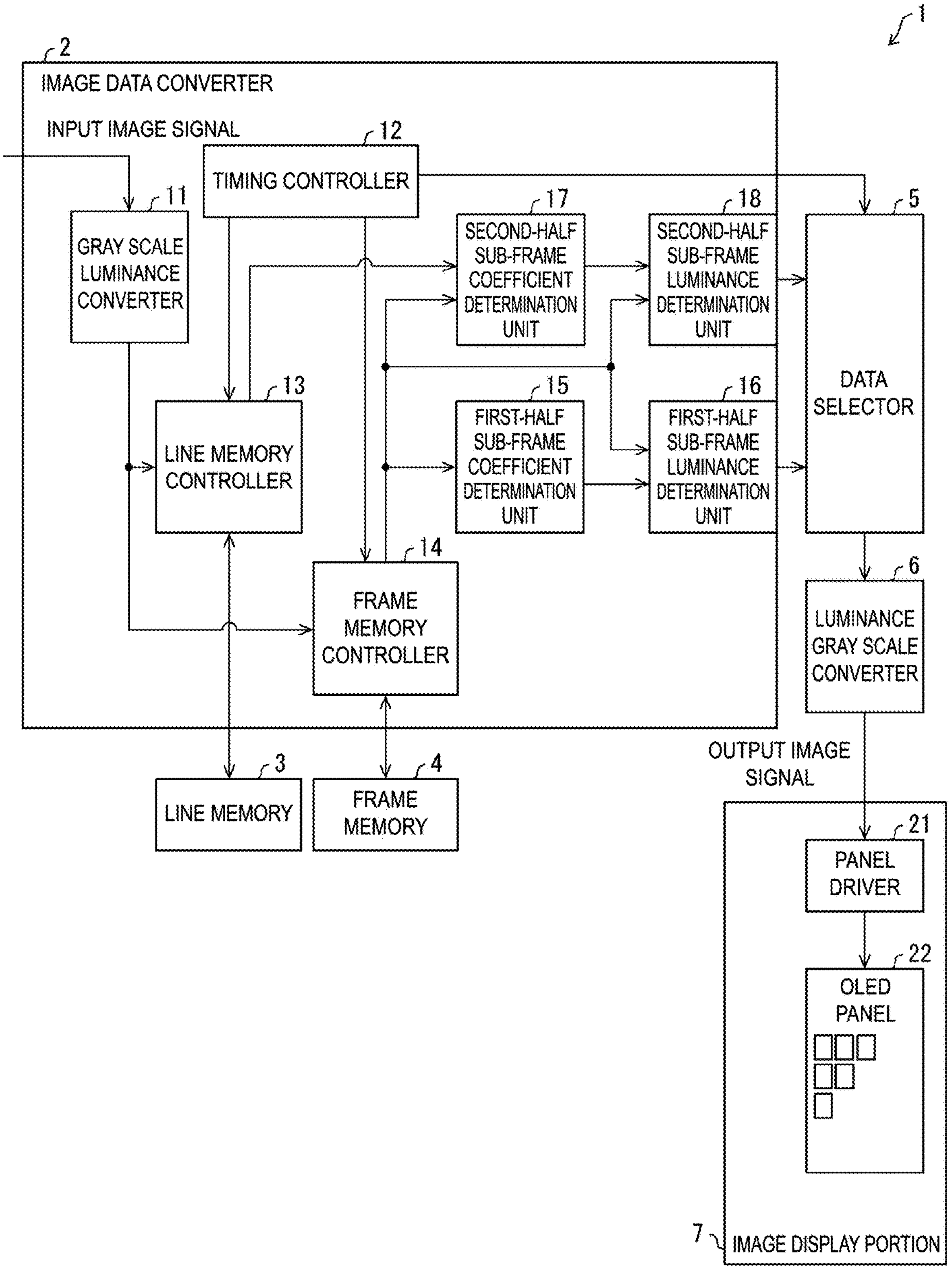
FIG. 1 is a block diagram illustrating a configuration of a display device according to an embodiment of the disclosure.

FIG. 1 is a block diagram illustrating a configuration of a display device 1 according to an embodiment of the disclosure. As illustrated in FIG. 1, the display device 1 includes an image data converter 2, a line memory 3, a frame memory 4, a data selector 5, a luminance gray scale converter 6, and an image display portion 7. The image data converter 2 includes a timing controller 12, a line memory controller 13 (pixel-of-interest specifying unit, second peripheral pixel specifying unit), a frame memory controller 14 (pixel-of-interest specifying unit, first peripheral pixel specifying unit), a first-half sub-frame coefficient determination unit 15 (first difference coefficient determination unit, first coefficient determination unit), a first-half sub-frame luminance determination unit 16 (first pixel value determination unit), a second-half sub-frame coefficient determination unit 17 (second difference coefficient determination unit, second coefficient determination unit), and a second-half sub-frame luminance determination unit 18 (second pixel value determination unit). The image display portion 7 includes a panel driver 21 and an OLED panel 22.

The display device 1 is achieved as various devices, such as PC monitors, television apparatuses or smartphones, having a function of displaying moving pictures. The OLED panel 22 is a panel capable of displaying a moving picture at a high frame rate such as 120 Hz or 144 Hz, and with a high-speed response.

Definitions of Terms

The display device 1 can display a moving picture on the OLED panel 22 by displaying individual images included in the moving picture on the OLED panel 22 for each of the corresponding frames. In the present embodiment, a frame at the present time (current frame) in the display device 1 is referred to as an n-th frame. A frame immediately before the current frame (previous frame) is referred to as an (n−1)-th frame, and a frame immediately after the current frame (subsequent frame) is referred to as an (n+1)-th frame.

The display device 1 improves moving picture display performance by driving the OLED panel 22 at double speed. Specifically, the display device 1 divides each frame for displaying a moving picture into two sub-frames and sequentially displays an image in each of the two sub-frames, thereby doubling the number of display frames of the moving picture. With this, the display device 1 can convert a moving picture at a frame rate of 60 Hz to a moving picture at a frame rate of 120 Hz and display the converted moving picture on the OLED panel 22.

In the present embodiment, of two sub-frames obtained by dividing one frame, a sub-frame for firstly displaying an image in the same one frame is referred to as a first-half sub-frame. A sub-frame for subsequently displaying an image in the same frame is referred to as a second-half sub-frame. That is, the display device 1 divides one frame into a first-half sub-frame occupying the first half of the one frame and a second-half sub-frame occupying the second half of the one frame.

In the present embodiment, two sub-frames obtained by dividing an n-th frame are referred to as an n-th first-half sub-frame and an n-th second-half sub-frame. Two sub-frames obtained by dividing an (n−1)-th frame are referred to as an (n−1)-th first-half sub-frame and an (n−1)-th second-half sub-frame. Further, two sub-frames obtained by dividing an (n+1)-th frame are referred to as an (n+1)-th first-half sub-frame and an (n+1)-th second-half sub-frame.

FIG. 2 is a diagram depicting names of luminance levels (pixel values) of pixels in images of three frames constituting input image data (moving picture) in an embodiment of the disclosure. FIG. 2 depicts names of luminance levels of five pixels in the same L-th row (L is a natural number) included in the images of the three frames. X1 to X5 depicted in FIG. 2 indicate positions of five consecutive pixels included in the L-th row of the image. To more generalize, in the present embodiment, the position of the i-th (i is a natural number) pixel included in the L-th row is referred to as Xi. In other words, a “pixel Xi” in the present embodiment refers to the i-th pixel included in the L-th row in the image.

In FIG. 2, I1(n) to I5(n) indicate luminance levels of the five pixels X1 to X5, respectively, included in the L-th row in the image of the n-th frame. To generalize, in the present embodiment, the luminance level of the i-th pixel included in the L-th row in the image of the n-th frame is referred to as Ii(n). To more generalize, in the present embodiment, the luminance level of the i-th pixel included in the L-th row in the image of the k-th frame (k is a natural number) is referred to as Ii(k). Therefore, in FIG. 2, I1(n−1) to I5(n−1) indicate luminance levels of the five pixels X1 to X5, respectively, included in the L-th row in the image of the (n−1)-th frame. In FIG. 2, I1(n+1) to I5(n+1) are luminance levels of the five pixels X1 to X5, respectively, included in the L-th row in the image of the (n+1)-th frame.

FIG. 3 is a diagram depicting names of luminance levels of pixels in images of six sub-frames constituting output image data (moving picture) in an embodiment of the disclosure. In FIG. 3, there are depicted names of luminance levels of five pixels included in an L-th row of images of the six sub-frames obtained by dividing three frames.

In FIG. 3, F1(n) to F5(n) indicate luminance levels of five pixels X1 to X5, respectively, included in the L-th row in the image of an n-th first-half sub-frame. To generalize, in the present embodiment, the luminance level of the i-th pixel included in the L-th row in the image of the n-th first-half sub-frame is referred to as Fi(n). To more generalize, in the present embodiment, the luminance level of the i-th pixel included in the L-th row in the image of a first-half sub-frame obtained by dividing the k-th frame is referred to as Ii(k). Therefore, in FIG. 3, F1(n−1) to F5(n−1) indicate luminance levels of the five pixels X1 to X5, respectively, included in the L-th row in the image of the (n−1)-th first-half sub-frame. In FIG. 3, F1(n+1) to F5(n+1) indicate luminance levels of the five pixels X1 to X5, respectively, included in the L-th row in the image of the (n+1)-th first-half sub-frame.

In FIG. 3, S1(n) to S5(n) indicate luminance levels of the five pixels X1 to X5, respectively, included in the L-th row in the image of an n-th second-half sub-frame. To generalize, in the present embodiment, the luminance level of the i-th pixel included in the L-th row in the image of the n-th second-half sub-frame is referred to as Si(n). To more generalize, in the present embodiment, the luminance level of the i-th pixel included in the L-th row in the image of a second-half sub-frame obtained by dividing the k-th frame is referred to as Si(k). Therefore, in FIG. 3, S1(n−1) to S5(n−1) indicate luminance levels of the five pixels X1 to X5, respectively, included in the L-th row in the image of the (n−1)-th second-half sub-frame. In FIG. 3, S1(n+1) to S5(n+1) indicate luminance levels of the five pixels X1 to X5, respectively, included in the L-th row in the image of the (n+1)-th second-half sub-frame.

The image data converter 2 converts an image of each frame included in input image data to an image of a first-half sub-frame and an image of a second-half sub-frame. At this time, the image data converter 2 converts the luminance level of a pixel Xi included in the image of the k-th frame to a luminance level Fi(k) of the pixel Xi of the k-th first-half sub-frame and a luminance level Si(k) of the pixel Xi of the k-th second-half sub-frame. For example, the image data converter 2 converts a luminance level I5(n) of the pixel X5 included in the image of an n-th frame to a luminance level F5(n) of the pixel X5 included in an n-th first-half sub-frame and a luminance level S5(n) of the pixel X5 included in the image of an n-th second-half sub-frame. Further, the image data converter 2 converts a luminance level I3(n+1) of the pixel X3 included in the image of an (n+1)-th frame to a luminance level F3(n+1) of the pixel X3 included in the image of an (n+1)-th first-half sub-frame and a luminance level S3(n+1) of the pixel X3 included in the image of an (n+1)-th second-half sub-frame.

Figure 4:
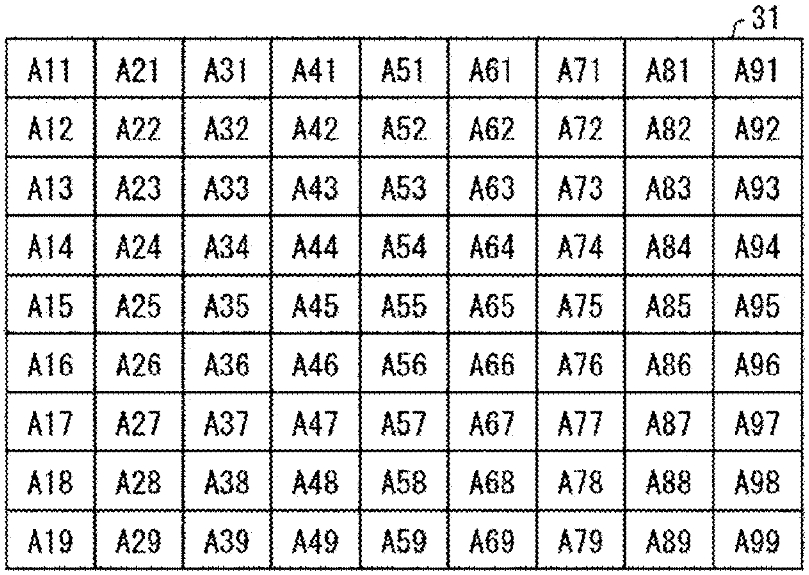
FIG. 4 is a diagram depicting a filter for determining a luminance level of each pixel in a first-half sub-frame.

FIG. 4 is a diagram depicting a filter 31 for determining a luminance level of each pixel in a first-half sub-frame. The image data converter 2 determines the luminance level of each pixel in a first-half sub-frame using the filter 31 (first filter) depicted in FIG. 4. The filter 31 is a planar filter having a plurality of filter values (first filter values) arranged two-dimensionally. In FIG. 4, the filter 31 has a total of 81 filter values arranged in a square shape of nine rows and nine columns. In FIG. 4, a filter value arranged at a position of the x-th row and the y-th column (x and y are each an integer equal to or larger than 1 and equal to or smaller than 9) of the filter 31 is referred to as Axy. Accordingly, All is a filter value arranged at a position of the first row and the first column of the filter 31, and A55 is a filter value arranged at a position of the fifth row and the fifth column of the filter 31.

Figure 5:
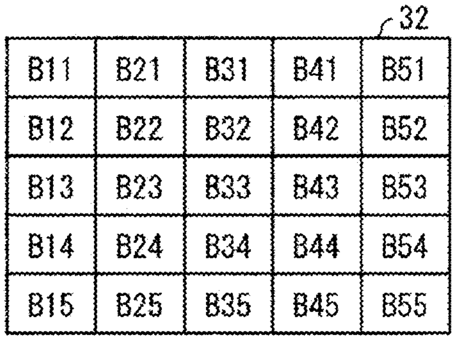
FIG. 5 is a diagram depicting a filter for determining a luminance level of each pixel in a second-half sub-frame.

FIG. 5 is a diagram depicting a filter 32 for determining a luminance level of each pixel in a second-half sub-frame. The image data converter 2 determines the luminance level of each pixel in the second-half sub-frame using the filter 32 (second filter) depicted in FIG. 5. The filter 32 is a planar filter having a plurality of filter values (second filter values) arranged two-dimensionally. In FIG. 5, the filter 32 has a total of 25 filter values arranged in a square shape of five rows and five columns. In FIG. 5, a filter value arranged at a position of the x-th row and the y-th column (x and y are each an integer equal to or larger than 1 and equal to or smaller than 5) of the filter 32 is referred to as Bxy. For example, B11 is a filter value arranged at a position of the first row and the first column of the filter 32, and B33 is a filter value arranged at a position of the third row and the third column of the filter 32.

As illustrated in FIG. 4 and FIG. 5, the size of the filter 31 is larger than the size of the filter 32. Specifically, the number of filter values arranged in the horizontal direction in the filter 31 is larger than the number of filter values arranged in the horizontal direction in the filter 32. In addition, the number of filter values arranged in the vertical direction in the filter 31 is larger than the number of filter values arranged in the vertical direction in the filter 32.

Specific Example of Luminance Level of Image

Figure 6:
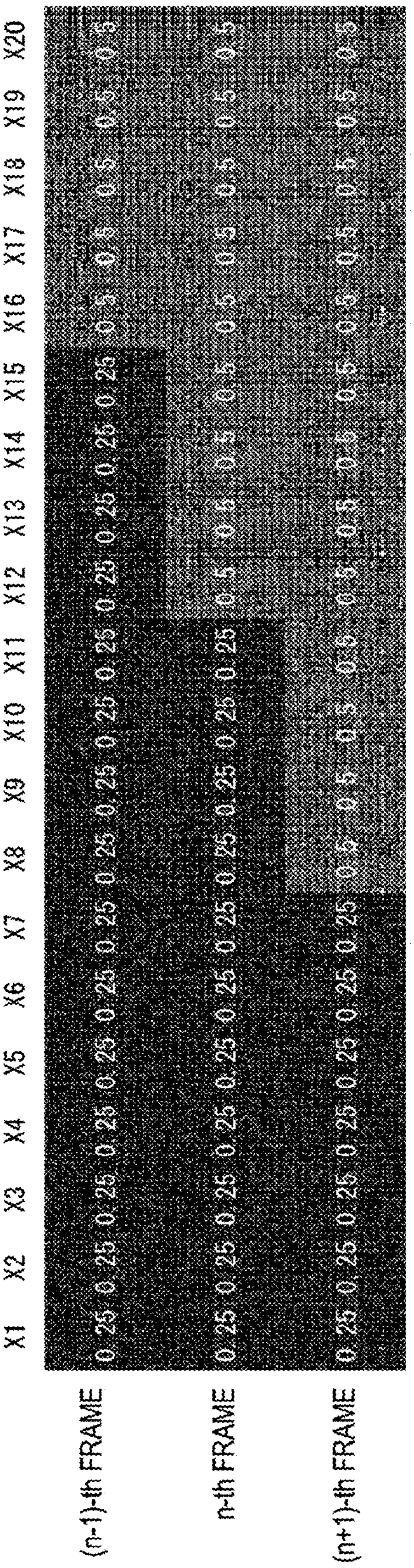
FIG. 6 is a diagram depicting actual luminance levels of pixels in images of three frames constituting input image data in an embodiment of the disclosure.

FIG. 6 is a diagram depicting actual luminance levels of pixels in images of three frames constituting input image data (moving picture) in an embodiment of the disclosure. Hereinafter, an example in which the image data converter 2 processes an image having luminance levels depicted in FIG. 6 will be described. The image includes an edge at a predetermined position in the row direction of the image. The edge is a portion where a first region in which the same first luminance level continues and a second region in which a second luminance level different from the first luminance level continues are in contact with each other in the image.

In the example of FIG. 6, there is an edge between a region where the luminance level 0.25 continues and a region where the luminance level 0.5 continues in the image. For example, in the image of the (n−1)-th frame, an edge is present between a pixel X15 and a pixel X16. In the image of the subsequent n-th frame, there is an edge between a pixel X11 and a pixel X12. In the image of the (n+1)-th frame subsequent to the n-th frame, there is an edge between a pixel X7 and a pixel X8. That is, when each image depicted in FIG. 6 is displayed at a frame rate of 60 Hz as it is, the edge present in the L-th row is displayed in such a manner as to move by four pixels from the right toward the left of the screen of the OLED panel 22 for each frame.

FIG. 7 is a diagram depicting actual luminance levels of pixels in images of six sub-frames constituting display data after conversion in an embodiment of the disclosure. The image data converter 2 converts the image of each frame depicted in FIG. 6 to the image of each sub-frame depicted in FIG. 7. For example, the image data converter 2 converts the luminance level "0.5" of the pixel X12 of the n-th frame to the luminance level "0" of the pixel X12 of the n-th first-half sub-frame and the luminance level "0.8" of the pixel X12 of the n-th second-half sub-frame. Details of the conversion procedure will be described below.

Specific Example of Filter Value

FIG. 8 is a diagram depicting a specific example of each filter value included in the filter 31 in an embodiment of the disclosure. In the present embodiment, the image data converter 2 uses the filter 31 depicted in FIG. 8 when determining the luminance level of each pixel of the n-th first-half sub-frame. In the filter 31, each of filter values A11, A19, A91, and A99 is 4. Each of filter values A21, A31, . . . , A81 is 8. Each of filter values A29, A39, . . . , A89 is 8. Each of filter values A12 to A18 is 8. Each of filter values A92 to A98 is 8. All of the remaining filter values are 16. As described above, in the filter 31, the filter value tends to become larger toward the center of the filter 31, and the filter value tends to become smaller toward a corner of the filter.

Figure 9:
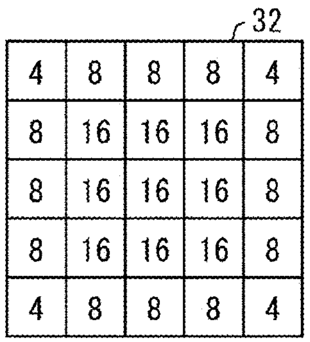
FIG. 9 is a diagram depicting a specific example of each filter value included in a filter in an embodiment of the disclosure.

FIG. 9 is a diagram depicting a specific example of each filter value included in the filter 32 in an embodiment of the disclosure. In the present embodiment, the image data converter 2 uses the filter 32 depicted in FIG. 9 when determining the luminance level of each pixel of the second-half sub-frame. In the filter 32, each of filter values B11, B15, B51, and B55 is 4. Each of filter values B21, B31, and B41 is 8. Each of filter values B25, B35, and B45 is 8. Each of filter values B12, B13, and B14 is 8. Each of filter values B52, B53, and B54 is 8. All of the remaining filter values are 16. As described above, in the filter 32, the filter value tends to become larger toward the center of the filter 32, and the filter value tends to become smaller toward a corner of the filter.

Flow of Processing Hereinafter, a flow of a series of processing when the display device 1 displays a moving picture will be described, particularly focusing on conversion processing by the image data converter 2. Hereinafter, an example will be described in which the display device 1 converts an image of an n-th frame to an image of an n-th first-half sub-frame and an image of an n-th second-half sub-frame, and displays the images in order on the OLED panel 22.

In the display device 1, a moving picture to be displayed is input to the image data converter 2 as an input image signal. The value of each pixel included in the input image signal is defined not as a luminance level but as a gray scale level. Then, a gray scale luminance converter 11 converts the gray scale level of each pixel in the input image signal into a luminance level. The luminance level discussed here is a normalized luminance level. Accordingly, the luminance level after conversion takes any value in the range from 0 to 1. The value 0 corresponds to the darkest color (black) in the image, and the value 1 corresponds to the brightest color (white) in the image. The gray scale luminance converter 11 outputs the input image signal after conversion to the frame memory controller 14 at a constant interval for each frame. The frame memory controller 14 stores the input image of one frame in the frame memory 4. In this case, it is assumed that the image of the n-th frame is stored in the frame memory 4.

Conversion Processing for n-Th First-Half Sub-Frame

Immediately after the start of the n-th frame, the timing controller 12 outputs a trigger signal for the image of the first-half sub-frame to the frame memory controller 14 and the data selector 5. In response to the input of the trigger signal, the frame memory controller 14 reads, from the frame memory 4, the luminance levels of a predetermined number of pixels included in the image of the n-th frame, which are necessary for determining the luminance level of each pixel included in the image of the n-th first-half sub-frame, and outputs the read luminance levels to the first-half sub-frame coefficient determination unit 15 and the first-half sub-frame luminance determination unit 16.

Hereinafter, an example will be described in which the image data converter 2 converts a luminance level I12(n) of a pixel X12 in the n-th frame to a luminance level F12(n) of the pixel X12 in the n-th first-half sub-frame, and to a luminance level S12(n) of the pixel X12 in the n-th second-half sub-frame.

Figure 10:
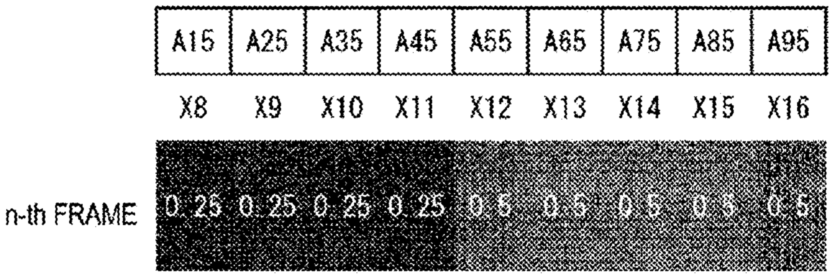
FIG. 10 is a diagram depicting luminance levels of a predetermined number of pixels in an n-th frame used to determine a luminance level of a pixel in an n-th first-half sub-frame.

FIG. 10 is a diagram depicting luminance levels of a predetermined number of pixels in the n-th frame used to determine a luminance level of the pixel X12 in the n-th first-half sub-frame. The frame memory controller 14 specifies the pixel X12 as a pixel of interest to be processed. Next, the frame memory controller 14 specifies, as peripheral pixels (first peripheral pixels) of the pixel X12, a plurality of pixels that are superimposed on the periphery in the row direction of the filter 31 when the pixel X12 is superimposed on the center A55 of the filter 31 in the L-th row of the image in the n-th frame. In this case, pixels X8 to X11 and pixels X13 to X16 are specified as the peripheral pixels (first peripheral pixels) of the pixel X12. The frame memory controller 14 reads, from the frame memory 4, respective luminance levels I8(n) to I16(n) of the peripheral pixels X8 to X11, the pixel of interest X12 and the peripheral pixels X13 to 16, and outputs the read luminance levels to the first-half sub-frame coefficient determination unit 15. The frame memory controller 14 further outputs the luminance level I12(n) of the pixel X12 to the first-half sub-frame luminance determination unit 16. As depicted in FIG. 10, I8(n) to I11(n) are each 0.25, and I12(n) to I16(n) are each 0.5.

Calculation of Difference Coefficient

The first-half sub-frame coefficient determination unit 15 determines difference coefficients (first difference coefficients) D1 to D9 based on the input luminance levels I8(n) to I16(n). To be specific, the first-half sub-frame coefficient determination unit 15 first calculates, as the difference coefficients D1 to D9, individual differences between the luminance levels of the pixels X8 to X16 including the pixel of interest X12 and the peripheral pixels in the image of the n-th frame and the luminance level of the pixel X12 in the image of the n-th frame as follows:

$$
\begin{aligned}
D1 &= I8(n) - I12(n) = 0.25 - 0.5 = -0.25\\
D2 &= I9(n) - I12(n) = 0.25 - 0.5 = -0.25\\
D3 &= I10(n) - I12(n) = 0.25 - 0.5 = -0.25\\
D4 &= I11(n) - I12(n) = 0.25 - 0.5 = -0.25\\
D5 &= I12(n) - I12(n) = 0.5 - 0.5 = 0\\
D6 &= I13(n) - I12(n) = 0.5 - 0.5 = 0\\
D7 &= I14(n) - I12(n) = 0.5 - 0.5 = 0\\
D8 &= I15(n) - I12(n) = 0.5 - 0.5 = 0\\
D9 &= I16(n) - I12(n) = 0.5 - 0.5 = 0
\end{aligned}
$$

Subsequently, the first-half sub-frame coefficient determination unit 15 converts the calculated difference coefficients D1 to D9 to 1 when the calculated value is not 0, and maintains the difference coefficients at 0 when the calculated value is 0. With this, the difference coefficients D1 to D9 are determined as follows.

$$
\begin{aligned}
D1 &= 1 * \text{converted from} - 0.25 \text{ to } 1\\
D2 &= 1 * \text{converted from} - 0.25 \text{ to } 1\\
D3 &= 1 * \text{converted from} - 0.25 \text{ to } 1\\
D4 &= 1 * \text{converted from} - 0.25 \text{ to } 1\\
D5 &= 0\\
D6 &= 0\\
D7 &= 0\\
D8 &= 0\\
D9 &= 0
\end{aligned}
$$

The first-half sub-frame coefficient determination unit 15 determines a first-half sub-frame coefficient Pf by performing an arithmetic operation using the filter 31 on each of the determined difference coefficients D1 to D9. First, the first-half sub-frame coefficient determination unit 15 individually multiplies each of the difference coefficients D1 to D9 by the filter values A15, A25, . . . , A95 respectively superimposed on the pixels X8 to X16 in the filter 31. With this, the difference coefficients D1 to D9 are converted as follows:

$$
\begin{aligned}
D1 &= 1 \times A15 = 1 \times 8 = 8\\
D2 &= 1 \times A25 = 1 \times 16 = 16\\
D3 &= 1 \times A35 = 1 \times 16 = 16\\
D4 &= 1 \times A45 = 1 \times 16 = 16\\
D5 &= 0 \times A55 = 0 \times 16 = 0\\
D6 &= 0 \times A65 = 0 \times 16 = 0\\
D7 &= 0 \times A75 = 0 \times 16 = 0\\
D8 &= 0 \times A85 = 0 \times 16 = 0\\
D9 &= 0 \times A95 = 0 \times 8 = 0
\end{aligned}
$$

Next, the first-half sub-frame coefficient determination unit 15 calculates a total sum Dsum of the difference coefficients D1 to D9 after conversion. That is, Dsum is obtained as follows: Dsum=8+16+16+16+0+0+0+0+0=56. Finally, the first-half sub-frame coefficient determination unit 15 determines the first-half sub-frame coefficient (first coefficient) Pf based on the total sum Dsum and a predetermined threshold value Th. In this case, the threshold value Th is assumed to be 40. The first-half sub-frame coefficient determination unit 15 determines the first-half sub-frame coefficient Pf by dividing the total sum Dsum by the threshold value Th. Note that, however, when the value after division exceeds 1, the value is converted to 1. In this case, Pf is obtained as follows: Pf=56÷40=1.4. Since Pf exceeds 1, Pf is converted to be equal to 1. As described above, the first-half sub-frame coefficient determination unit 15 finally determines that Pf is equal to 1.

Determination of Luminance Level

The first-half sub-frame coefficient determination unit 15 outputs the determined first-half sub-frame coefficient Pf to the first-half sub-frame luminance determination unit 16. The first-half sub-frame luminance determination unit 16 determines the luminance level (first pixel value) F12(n) of the pixel X12 in the n-th first-half sub-frame based on the luminance level I12(n) of the pixel of interest X12 and the input first-half sub-frame coefficient Pf. At this time, the first-half sub-frame luminance determination unit 16 determines F12(n) based on conversion data (first conversion data) that defines the correspondence between the output luminance level (output pixel value) and both the input luminance level (input pixel value) and the first-half sub-frame coefficient Pf. In the present embodiment, when the input luminance level is represented by In and the output luminance level is represented by Fn, the conversion data for the n-th first-half sub-frame is defined by the following arithmetic expressions:

$$
\begin{aligned}
Fn &= (-1 \times \text{In}) \times Pf + \text{In} \,(\text{when In is 0.5 or less})\\
Fn &= (\text{In} - 1) \times Pf + \text{In} \,(\text{when In is greater than 0.5})
\end{aligned}
$$

The first-half sub-frame luminance determination unit 16 determines F12(n) as Fn by substituting I12(n) into In defined in the conversion data. In this case, since I12(n) is equal to 0.5 and Pf is equal to 1, Fn is obtained as follows: Fn=(−1×0.5)×1+0.5=0. Thus, the first-half sub-frame luminance determination unit 16 determines that F12(n) is equal to 0.

The first-half sub-frame luminance determination unit 16 outputs the determined luminance level F12(n) to the data selector 5. The data selector 5 stores the input luminance level F12(n) in a memory (not illustrated). When the luminance levels of a certain number of pixels included in the image of the n-th first-half sub-frame are stored in the memory, the data selector 5 outputs those luminance levels of the pixels to the luminance gray scale converter 6. For example, when the luminance levels of all the pixels of the image in the n-th first-half sub-frame are stored in the memory, the data selector 5 reads out all the luminance levels of all the pixels from the memory, and outputs the read luminance levels to the luminance gray scale converter 6. The luminance gray scale converter 6 converts the input luminance levels of all the pixels into gray scale levels to generate an output image signal corresponding to the image of the n-th first-half sub-frame. The luminance gray scale converter 6 outputs the generated output image signal to the image display portion 7. The panel driver 21 of the image display portion 7 drives each pixel of the OLED panel 22 by outputting the input image signal to the OLED panel 22 as a source signal. Thus, the image of the n-th first-half sub-frame can be displayed on the OLED panel 22.

Conversion Processing for n-Th Second-Half Sub-Frame

Immediately after having determined the luminance levels of all the pixels in the n-th first-half sub-frame, the timing controller 12 outputs a trigger signal for the image of the second-half sub-frame to the line memory controller 13, the frame memory controller 14, and the data selector 5. In response to the input of the trigger signal, the frame memory controller 14 reads, from the frame memory 4, the luminance levels of a predetermined number of pixels included in the image of the n-th frame, which are necessary for determining the luminance level of each pixel included in the image of the n-th second-half sub-frame, and outputs the read luminance levels to the second-half sub-frame coefficient determination unit 17 and the second-half sub-frame luminance determination unit 18.

FIG. 11 is a diagram depicting luminance levels of a predetermined number of pixels in the n-th frame and luminance levels of a predetermined number of pixels in the (n+1)-th frame, which are used to determine the luminance level of the pixel X12 in the n-th second-half sub-frame. The frame memory controller 14 specifies the pixel X12 as a pixel of interest to be processed. Next, the frame memory controller 14 specifies, as peripheral pixels (second peripheral pixels) of the pixel X12, the pixels that are respectively superimposed on the periphery in the row direction of the filter 32 when the pixel X12 is superimposed on the center B33 of the filter 32 in the L-th row of the image in the n-th frame. In this case, pixels X10 and X11 and pixels X13 and X14 are specified as the peripheral pixels of the pixel X12. The frame memory controller 14 reads, from the frame memory 4, luminance levels I10(n) to I14(n) of the total of five pixels X10 to X14 including the pixel X12 and its peripheral pixels, and outputs the read luminance levels to the second-half sub-frame coefficient determination unit 17. The frame memory controller 14 further outputs the luminance level I12(n) of the pixel X12 to the second-half sub-frame luminance determination unit 18. As depicted in FIG. 11, I10(n) and I11(n) are each 0.25, and I12(n) to I14(n) are each 0.5.

At the same time, the line memory controller 13 specifies the pixel X12 as a pixel of interest to be processed. Subsequently, the line memory controller 13 specifies, as peripheral pixels of the pixel X12, pixels that are respectively superimposed on the peripheral position in the row direction of the filter 32 when the pixel X12 is superimposed on the center B33 of the filter 32 in the L-th row of the image in the (n+1)-th frame. In this case, the pixels X10 and X11 and the pixels X13 and X14 are specified as the peripheral pixels of the pixel X12. The line memory controller 13 requests luminance levels I10(n+1) to I14(n+1) of the pixel X12 and its peripheral pixels of the image in the (n+1)-th frame from the gray scale luminance converter 11. In response to the above-mentioned request, the gray scale luminance converter 11 outputs the luminance levels I10(n+1) to I14(n+1) to the line memory controller 13. The line memory controller 13 sequentially stores each of the input luminance levels in the line memory 3. Upon completion of storing the input luminance levels, the line memory controller 13 reads the luminance levels I10(n+1) to I14(n+1) from the line memory 3 and outputs the read luminance levels to the second-half sub-frame coefficient determination unit 17. As depicted in FIG. 11, I10(n+1) to I14(n+1) are each 0.5.

Calculation of Difference Coefficient

The second-half sub-frame coefficient determination unit 17 determines difference coefficients (second difference coefficients) D1 to D5 respectively based on the input luminance levels I10(n) to I14(n) and I10(n+1) to I14(n+1). To be specific, the second-half sub-frame coefficient determination unit 17 first calculates, as the difference coefficients D1 to D5, differences between the luminance levels I10(n+1) to I14(n+1) in the (n+1)-th frame and the luminance levels I10(n) to I14(n) in the n-th frame of the pixels X10 to X14, respectively, in the manner as follows:

$$D1 = I10(n) - I10(n+1) = 0.5 - 0.25 = 0.25$$

$$D2 = I11(n) - I11(n+1) = 0.5 - 0.25 = 0.25$$

$$D3 = I12(n) - I12(n+1) = 0.5 - 0.5 = 0$$

$$D4 = I13(n) - I13(n+1) = 0.5 - 0.5 = 0$$

$$D5 = I14(n) - I14(n+1) = 0.5 - 0.5 = 0$$

Subsequently, the second-half sub-frame coefficient determination unit 17 converts the calculated difference coefficients D1 to D5 to 1 when the calculated value is not 0, and maintains the difference coefficients at 0 when the calculated value is 0. With this, the difference coefficients D1 to D5 are determined as follows.

$$\begin{aligned} &D1 = 1 * \text{converted from 0.25 to 1} \\ &D2 = 1 * \text{converted from 0.25 to 1} \\ &D3 = 0 \\ &D4 = 0 \\ &D5 = 0 \end{aligned} .$$

The second-half sub-frame coefficient determination unit 17 determines a second-half sub-frame coefficient Ps by performing an arithmetic operation using the filter 32 on each of the determined difference coefficients D1 to D5. First, the second-half sub-frame coefficient determination unit 17 individually multiplies each of the difference coefficients D1 to D5 by the filter values B13, B23, . . . , B53 respectively superimposed on the pixels X10 to X14 in the filter 32. With this, the difference coefficients D1 to D5 are converted as follows:

$$\begin{aligned} &D1 = 1 \times B13 = 1 \times 8 = 8 \\ &D2 = 1 \times B23 = 1 \times 16 = 16 \\ &D3 = 0 \times B33 = 0 \times 16 = 0 \\ &D4 = 0 \times B43 = 0 \times 16 = 0 \\ &D5 = 0 \times B53 = 0 \times 8 = 0 \end{aligned} .$$

Next, the second-half sub-frame coefficient determination unit 17 calculates a total sum Dsum of the difference coefficients D1 to D5 after conversion. That is, Dsum is obtained as follows: Dsum=8+16+0+0+0=24. Finally, the second-half sub-frame coefficient determination unit 17 determines the second-half sub-frame coefficient (second coefficient) Ps based on the total sum Dsum and the predetermined threshold value Th. In this case, the threshold value Th is assumed to be 40. The second-half sub-frame coefficient determination unit 17 determines the second-half sub-frame coefficient Ps by dividing the total sum Dsum by the threshold value Th. Note that, however, when the value after division exceeds 1, the value is converted to 1. In this case, Ps is obtained as follows: Ps=24÷40=0.6. As described above, the second-half sub-frame coefficient determination unit 17 finally determines that Ps is equal to 0.6.

Determination of Luminance Level

The second-half sub-frame coefficient determination unit 17 outputs the determined second-half sub-frame coefficient Ps to the second-half sub-frame luminance determination unit 18. The second-half sub-frame luminance determination unit 18 determines the luminance level (second pixel value) S12(n) of the pixel X12 in the n-th second-half sub-frame based on the luminance level I12(n) of the pixel X12 and the input second-half sub-frame coefficient Ps. At this time, the second-half sub-frame luminance determination unit 18 determines S12(n) based on conversion data (second conversion data) that defines the correspondence between the output luminance level and both the input luminance level and the second-half sub-frame coefficient Ps. In the present embodiment, when the input luminance level is represented by In and the output luminance level is represented by Sn, the conversion data for the n-th second-half sub-frame is defined by the following arithmetic expressions:

$$Sn = \mathrm{In} \times Ps + \mathrm{In} \text{ (when In is 0.5 or less)}$$
$$Sn = (1 - \mathrm{In}) \times Ps + \mathrm{In} \text{ (when In is greater than 0.5)}.$$

The second-half sub-frame luminance determination unit 18 determines S12(n) as Sn by substituting I12(n) into In defined in the conversion data. In this case, since I12(n) is equal to 0.5 and Ps is equal to 0.6, Sn is obtained as follows: Sn=0.5×0.6+0.5=0.8. Thus, the second-half sub-frame luminance determination unit 18 determines that S12(n) is equal to 0.8.

The second-half sub-frame luminance determination unit 18 outputs the determined luminance level S12(n) to the data selector 5. The data selector 5 stores the input luminance level S12(n) in a memory (not illustrated). When the luminance levels of a certain number of pixels included in the image of the n-th second-half sub-frame are stored in the memory, the data selector 5 outputs the luminance levels of the pixels to the luminance gray scale converter 6. For example, when the luminance levels of all the pixels of the image in the n-th second-half sub-frame are stored in the memory, the data selector 5 reads out all the luminance levels of all the pixels from the memory, and outputs the read luminance levels to the luminance gray scale converter 6. The luminance gray scale converter 6 converts the input luminance levels of all the pixels into gray scale levels to generate an output image signal corresponding to the image of the n-th second-half sub-frame. The luminance gray scale converter 6 outputs the generated output image signal to the image display portion 7. The panel driver 21 of the image display portion 7 drives each pixel of the OLED panel 22 by outputting the input image signal to the OLED panel 22 as a source signal. Thus, the image of the n-th second-half sub-frame can be displayed on the OLED panel 22.

Properties of Conversion Data

Figure 12:
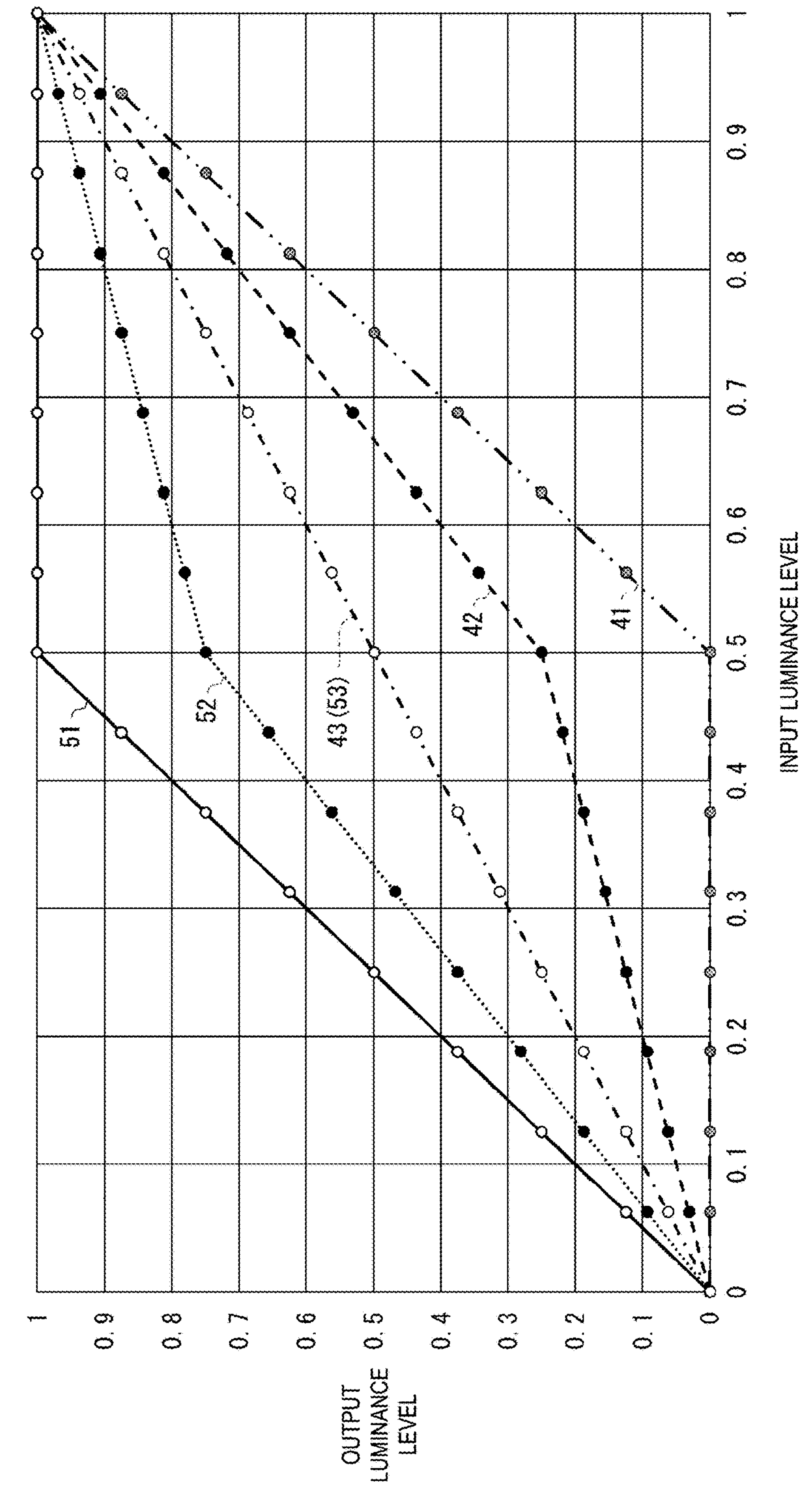
FIG. 12 is a graph depicting correspondence between input luminance levels and output luminance levels in conversion data.

FIG. 12 is a graph depicting the correspondence between input luminance levels and output luminance levels in the conversion data. In FIG. 12, graph 41 to graph 43 depict the correspondence between the input luminance levels and the output luminance levels in the conversion data for determining the luminance levels of the first-half sub-frame. Graph 51 to graph 53 depict the correspondence between the input luminance levels and the output luminance levels in the conversion data for determining the luminance levels of the second-half sub-frame.

Graph 41 is a graph when the first-half sub-frame coefficient Pf is 1, graph 42 is a graph when the first-half sub-frame coefficient Pf is 0.5, and graph 43 is a graph when the first-half sub-frame coefficient Pf is 0. As described above, in the conversion data for determining the luminance levels of the first-half sub-frame, the correspondence between the input luminance levels and the output luminance levels differs depending on the value of the first-half sub-frame coefficient Pf.

Graph 51 is a graph when the second-half sub-frame coefficient Ps is 1, graph 52 is a graph when the second-half sub-frame coefficient Ps is 0.5, and graph 53 is a graph when the second-half sub-frame coefficient Ps is 0. As described above, in the conversion data for determining the luminance levels of the second-half sub-frame, the correspondence between the input luminance levels and the output luminance levels differs depending on the value of the second-half sub-frame coefficient Ps.

As depicted in FIG. 12, as the first-half sub-frame coefficient Pf and the second-half sub-frame coefficient Ps each having the same value are larger, the difference between the output luminance level corresponding to the input luminance level in the conversion data for the n-th first-half sub-frame and the output luminance level corresponding to the same input luminance level in the second conversion data for the n-th second-half sub-frame is larger. More specifically, in a range where the input luminance level is larger than 0 and smaller than 1, the output luminance level corresponding to the input luminance level in the conversion data for the n-th second-half sub-frame is larger than the output luminance level corresponding to the same input luminance level in the conversion data for the n-th first-half sub-frame.

Specifically, as depicted in graph 43, when Pf is equal to 0, the output luminance level is equal to the input luminance level over the whole range of the input luminance levels. Likewise, as depicted in graph 53, when Ps is equal to 0, the output luminance level is equal to the input luminance level over the whole range of the input luminance levels. As depicted in graph 41 and graph 51, when Pf is equal to 1 and Ps is also equal to 1, the difference between the output luminance level of the first-half sub-frame and the output luminance level of the second-half sub-frame with respect to the same input luminance level is largest. More specifically, as Pf and Ps are larger, the difference between the output luminance level of the first-half sub-frame and the output luminance level of the second-half sub-frame with respect to the same input luminance level is larger.

FIG. 13 is a diagram depicting the value of the first-half sub-frame coefficient Pf and the value of the second-half sub-frame coefficient Ps each determined for the pixels X1 to X20 in each sub-frame. FIG. 13 depicts each first-half sub-frame coefficient Pf of the pixels X1 to X20 in the (n−1)-th first-half sub-frame and each second-half sub-frame coefficient Ps of the pixels X1 to X20 in the (n−1)-th second-half sub-frame respectively determined from the luminance levels of the pixels X1 to X20 in the (n−1)-th frame depicted in FIG. 6. FIG. 13 further depicts each first-half sub-frame coefficient Pf of the pixels X1 to X20 in the n-th first-half sub-frame and each second-half sub-frame coefficient Ps of the pixels X1 to X20 in the n-th second-half sub-frame respectively determined from the luminance levels of the pixels X1 to X20 in the n-th frame depicted in FIG. 6.

When determining the n-th first-half sub-frame coefficient Pf, the image data converter 2 calculates the difference coefficients D1 to D9 based on the differences between the luminance levels of the pixel of interest and its peripheral pixels in the image of the n-th frame and the luminance level of the pixel of interest in the image of the n-th frame. With this, the image data converter 2 determines that the first-half sub-frame coefficient Pf is equal to 1 for the pixels in the image of the n-th first-half sub-frame in a certain range centered at the same position as that of the edge included in the image of the n-th frame and determined in accordance with a size in the horizontal direction of the filter 31. Thus, as depicted in FIG. 13, the image data converter 2 can set the position of the edge included in the image of the n-th first-half sub-frame to the same position as that of the edge included in the original image of the n-th frame.

When determining the n-th second-half sub-frame coefficient Ps, the image data converter 2 calculates the difference coefficients D1 to D5 based on the differences between the luminance levels of the pixel of interest and its peripheral pixels in the image of the (n+1)-th frame and the luminance levels of the pixel of interest and its peripheral pixels in the image of the n-th frame. With this, the image data converter 2 determines that the second-half sub-frame coefficient Ps is equal to 1 for the pixels in the image of the n-th second-half sub-frame in a certain range taking the midpoint position between the edge position included in the image of the n-th frame and the edge position included in the image of the (n+1)-th frame as the center and determined in accordance with a size in the horizontal direction of the filter 32. Thus, as depicted in FIG. 13, the image data converter 2 can set the position of the edge included in the image of the n-th second-half sub-frame to a position between the edge position of the n-th first-half sub-frame and the edge position of the (n+1)-th first-half sub-frame.

The first-half sub-frame coefficient Pf and the second-half sub-frame coefficient Ps both approach 1 as the pixel is closer to the edge, and approach 0 as the pixel is farther from the edge. Accordingly, in FIG. 13, the position of a pixel where Pf or Ps is 1 corresponds to an edge, and the position of a pixel where Pf or Ps is 0 corresponds to a solid portion in the image. As depicted in FIG. 13, a range of pixels (X12-X15) in the (n−1)-th second-half sub-frame where Ps is equal to 1 is closer to a range of pixels (X10-X13) in the n-th first-half sub-frame where Ps is equal to 1 than a range of pixels (X14-X17) in the (n−1)-th first-half sub-frame where Pf is equal to 1. Although not illustrated, a range of pixels (X8-X11) in the n-th second-half sub-frame where Ps is equal to 1 is closer to a range of pixels (X6-X9) in the (n+1)-th first-half sub-frame where Ps is equal to 1 than a range of pixels (X10-X13) in the n-th first-half sub-frame where Pf is equal to 1. Thus, when the OLED panel 22 is driven at double speed, an edge present in the L-th row is displayed in such a manner as to move by two pixels for each sub-frame from the right toward the left of the screen of the OLED panel 22. As a result, since the edge can be stepwisely moved and displayed for each sub-frame, the user can visually recognize the position of the edge correctly at the time of double-speed driving.

The range of pixels in which the second-half sub-frame coefficient Ps is 1 in the image of the n-th second-half sub-frame is determined in accordance with a moving speed of the edge and the size of the filter 32. As the moving speed of the edge is higher, the range in which the difference corresponding to each peripheral pixel superimposed on the filter value in the range in the horizontal direction of the filter 32 takes a value other than 0 becomes wider, and thus the frequency at which the second-half sub-frame coefficient Ps comes to be 1 becomes higher. Accordingly, the range of pixels in which the second-half sub-frame coefficient Ps is 1 becomes wider as the moving speed of the edge is higher and the size of the filter 32 is larger. On the other hand, the range of pixels in which the second-half sub-frame coefficient Ps is 1 in the image of the n-th first-half sub-frame is determined only by the size of the filter 31 regardless of the moving speed of the edge. Accordingly, as the moving speed of the edge is higher, the difference between the range of pixels in which the second-half sub-frame coefficient Ps is 1 and the range of pixels in which the first-half sub-frame coefficient Ps is 1 is further increased.

Then, by making the size of the filter 31 larger than the size of the filter 32, the range of pixels in which the second-half sub-frame coefficient Ps is 1 can be limited to the size of the filter 32 at the maximum regardless of the moving speed of the edge. This makes it possible to prevent the range of pixels in which the second-half sub-frame coefficient Ps is 1 from becoming wider than the range of pixels in which the first-half sub-frame coefficient Pf is 1, and therefore, as depicted in FIG. 13, the coefficient Ps can be set to 1, which indicates an edge, in an appropriate range of the image in the n-th second-half sub-frame.

Figure 14:
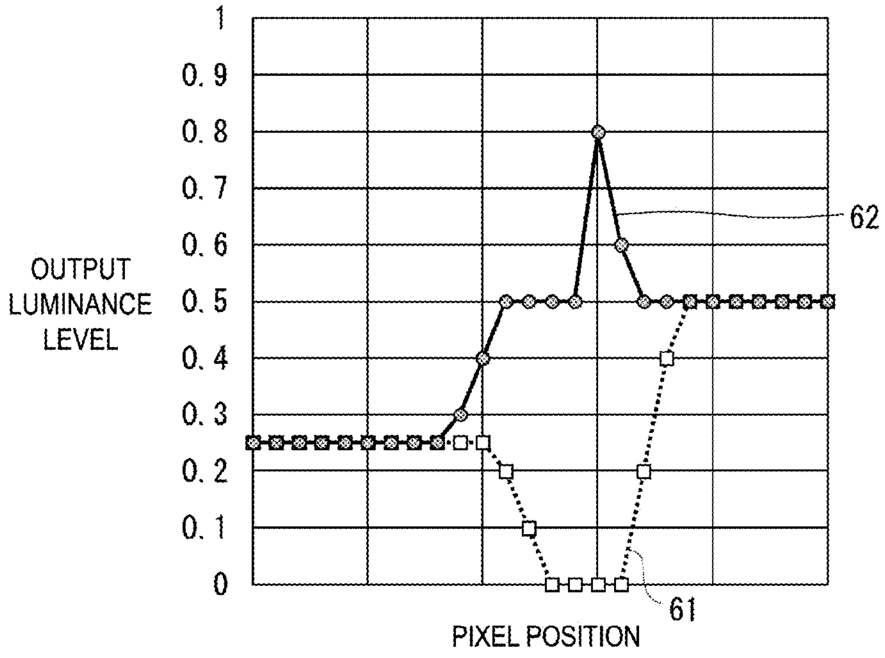
FIG. 14 is a diagram depicting a distribution of luminance levels of pixels in an L-th row of an n-th first-half sub-frame and a distribution of luminance levels of pixels in an L-th row of an n-th second-half sub-frame.

FIG. 14 is a diagram depicting a distribution of luminance levels of pixels in the L-th row of the n-th first-half sub-frame and a distribution of luminance levels of pixels in the L-th row of the n-th second-half sub-frame. In FIG. 14, graph 61 depicts a distribution of luminance levels of the pixels in the L-th row of the n-th first-half sub-frame depicted in FIG. 7. Graph 62 depicts a distribution of luminance levels of the pixels in the L-th row of the n-th second-half sub-frame depicted in FIG. 7. In FIG. 14, the horizontal axis represents the position of each pixel in the L-th row, and the vertical axis represents the output luminance level after conversion.

As depicted in FIG. 7 and graph 61 of FIG. 14, the luminance levels F10(n) to F13(n) of the pixels X10 to X13 in the n-th first-half sub-frame are all 0. That is, in the image of the n-th first-half sub-frame, black display is inserted at the position of the edge present near the pixel X12. Further, as depicted in FIG. 7 and graph 62 of FIG. 14, the luminance levels S10(n) to S14(n) of the pixels X10 to X14 in the n-th second-half sub-frame are all 0.5 or more. That is, in the image of the n-th second-half sub-frame, the luminance level at the position of the edge present near the pixel X12 is more emphasized.

As a result, the user visually recognizes the luminance levels in which the luminance levels of the pixels X10 to X13 inserted with the black display in the n-th first-half sub-frame and the emphasized luminance levels of the pixels X10 to X14 in the n-th second-half sub-frame are offset, as the luminance levels of the pixels X10 to X14. This makes it possible for the user to visually recognize the edge present at the position of the pixel X12 correctly even at the time of double-speed driving.

As depicted in FIG. 7 and graph 61 and graph 62 of FIG. 14, in a region away from the edge, the luminance level of the n-th first-half sub-frame and the luminance level of the n-th second-half sub-frame at the same pixel position have the same value. For example, in a region on the left side of the edge, the luminance level is 0.25 in both the n-th first-half sub-frame and the n-th second-half sub-frame. In a region on the right side of the edge, the luminance level is 0.5 in both the n-th first-half sub-frame and the n-th second-half sub-frame. As described above, the insertion position of the black display in the n-th first-half sub-frame is limited to the position at which the edge is present.

Accordingly, since the display device 1 can display the edge more sharply by inserting the black display, the display quality of moving pictures can be improved. Furthermore, since the black display is inserted only in the vicinity of the edge, even if a flicker occurs in the moving picture displayed at 120 Hz, the occurrence position of the flicker is limited to the vicinity of the edge where the black display is inserted. As a result, the occurrence position of the flicker in the moving picture may be confined in a minimum range, and therefore the degradation in display quality of the moving picture may be prevented in a region other than the edge.

Moving-Picture Blur Waveform

Figure 15:
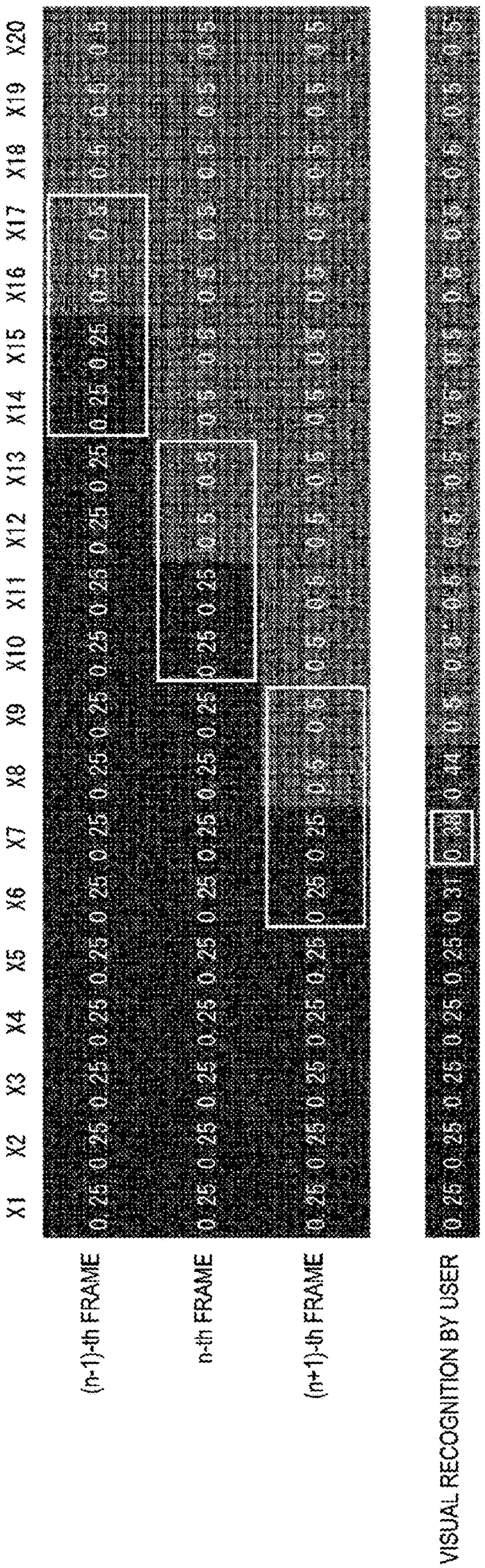
FIG. 15 is a diagram depicting a luminance level of each pixel visually recognized by a user when a moving picture is displayed without double-speed driving.

FIG. 15 is a diagram depicting the luminance level of each pixel visually recognized by the user when a moving picture is displayed without double-speed driving. When an edge included in the image is displayed while moving in the left direction of the screen as depicted in FIG. 15, the eyes of the user visually recognize the image in such a manner as to chase the movement of the edge in each frame. At this time, the user sequentially follows and visually recognizes the luminance level of each pixel at the movement destination of the line of sight, and finally visually recognizes an integrated value (average value) of the luminance levels having been visually recognized, as the actual luminance level. In FIG. 15, the moving speed of the edge is equivalent to four pixels per frame. Therefore, for example, the user visually recognizes the luminance levels of four pixels X14 to X17 in the (n−1)-th frame, visually recognizes the luminance levels of four pixels X10 to X13 on the left side in the subsequent n-th frame, and finally visually recognizes the luminance levels of further four pixels X6 to X9 on the left side. Then, the user visually recognizes the average value of these 12 luminance levels as the actual luminance level of the pixel X7. As a result, the user visually recognizes 0.38 as the luminance level of the pixel X7. As a result of following the line of sight of the user as discussed above, a blur of the image appears at the position of the edge visually recognized by the user. This phenomenon is called a moving-picture blur.

In the example of FIG. 15, in the image of each frame, only two pixels constitute the edge. They are a pixel with a luminance level of 0.25 and a pixel with a luminance level of 0.5 arranged adjacent thereto. On the other hand, as for the pixels constituting the edge in terms of the luminance levels visually recognized by the user, the pixels X6 to X8 with luminance levels of 0.31, 0.38, and 0.44, respectively, are arranged between the pixel X5 with a luminance level of 0.25 and the pixel X9 with a luminance level of 0.5. Thus, the user visually recognizes a range of five pixels including the pixels X4 to X8 as the edge. As a result, the width of the edge visually recognized by the user is larger than the width of the edge included in the original image, whereby the edge appears blurred to the user.

Figure 16:
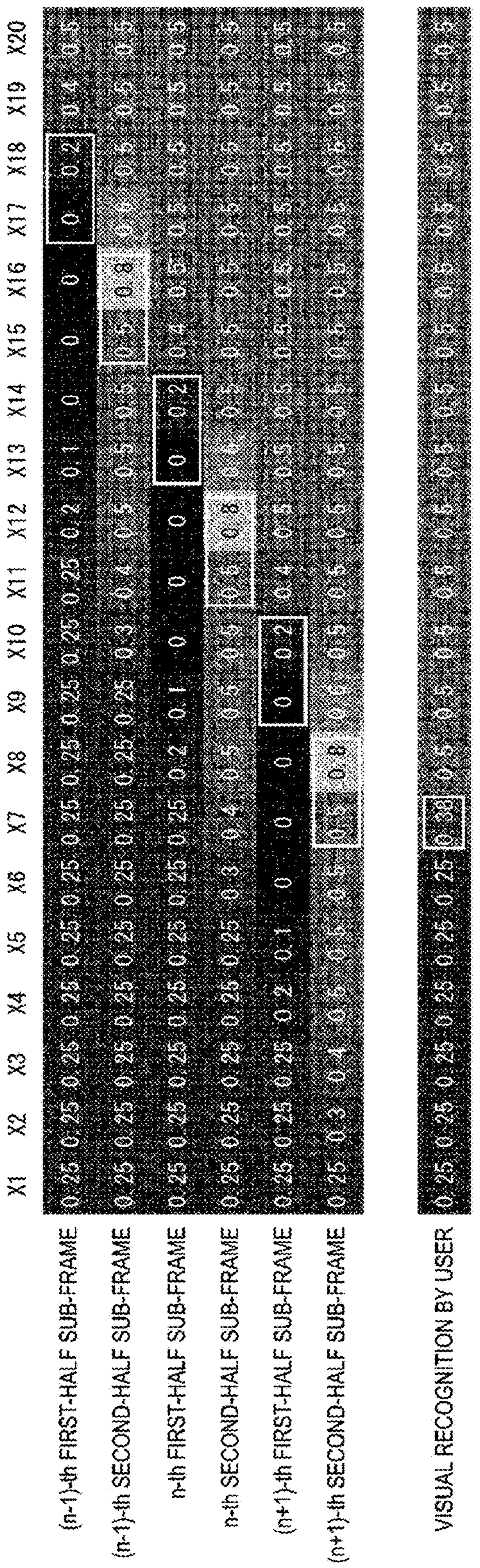
FIG. 16 is a diagram depicting a luminance level of each pixel visually recognized by a user when a moving picture is driven at double speed and displayed.

FIG. 16 is a diagram depicting the luminance level of each pixel visually recognized by the user when a moving picture is driven at double speed and displayed. When an edge included in the image is displayed while moving in the left direction of the screen as depicted in FIG. 16, the eyes of the user visually recognize the image in such a manner as to chase the movement of the edge in each sub-frame. At this time, the user sequentially follows and visually recognizes the luminance level of each pixel at the movement destination of the line of sight, and finally visually recognizes an integrated value (average value) of the luminance levels having been visually recognized, as the actual luminance level. In FIG. 16, the moving speed of the edge is equivalent to two pixels per sub-frame. Accordingly, for example, the user visually recognizes the luminance levels of two pixels X17 and X18 in the (n−1)-th first-half sub-frame, and visually recognizes the luminance levels of two pixels X15 and X16 in the subsequent (n−1)-th second-half sub-frame. The user visually recognizes the luminance levels of two pixels X13 and X14 in the subsequent n-th first-half sub-frame, and further visually recognizes the luminance levels of two pixels X11 and X12 in the subsequent n-th second-half sub-frame. Finally, the user visually recognizes the luminance levels of two pixels X9 and X10 in the subsequent (n+1)-th first-half sub-frame, and further visually recognizes the luminance levels of two pixels X7 and X8 in the subsequent (n+1)-th second-half sub-frame. Then, the user visually recognizes the average value of these 12 luminance levels as the actual luminance level of the pixel X7. As a result, the user visually recognizes 0.38 as the luminance level of the pixel X7. When a moving picture is driven at double speed and displayed at 120 Hz as well, a blur of the image appears at the position of the edge visually recognized by the user, as a result of following the line of sight of the user.

In the example of FIG. 16, as for the pixels constituting the edge in terms of the luminance levels visually recognized by the user, only the pixel X7 with a luminance level of 0.38 is arranged between the pixel X6 with a luminance level of 0.25 and the pixel X8 with a luminance level of 0.5. Thus, the user visually recognizes a range of three pixels including the pixels X6 to X8 as the edge. As a result, the width of the edge visually recognized by the user is larger than the width of the edge included in the original image, whereby the edge appears blurred to the user. However, the degree of the blur is smaller than that of the moving picture displayed at 60 Hz.

Figure 17:
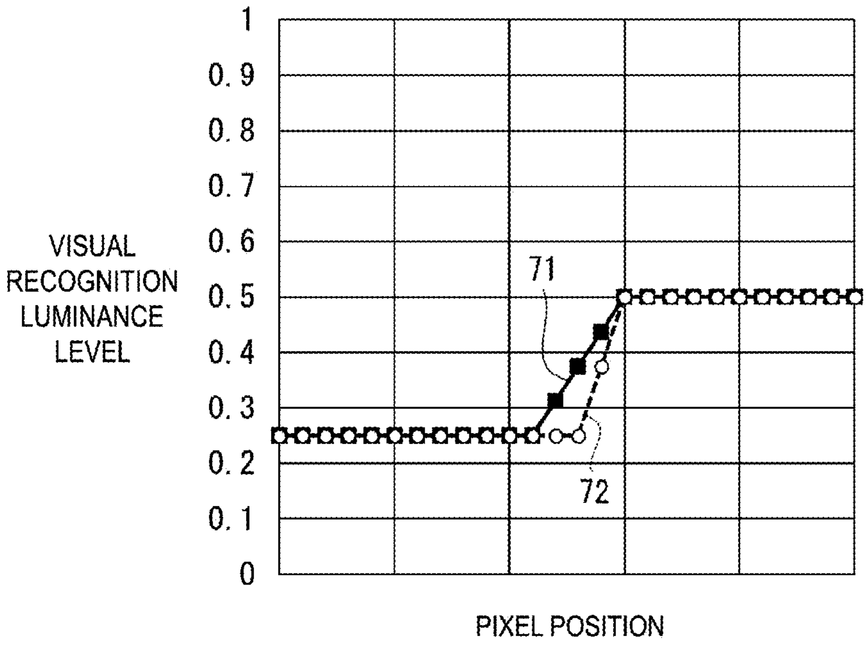
FIG. 17 is a diagram depicting a moving-picture blur waveform visually recognized by a user.

FIG. 17 is a diagram illustrating a moving-picture blur waveform visually recognized by the user. Graph 71 is a graph depicting a distribution of luminance levels actually visually recognized by the user when a moving picture is displayed at 60 Hz as depicted in FIG. 15. Graph 72 is a graph depicting a distribution of luminance levels actually visually recognized by the user when the moving picture is driven at double speed and displayed at 120 Hz as depicted in FIG. 16. In FIG. 17, the horizontal axis represents the position of each pixel in the L-th row of the image, and the vertical axis represents the luminance level actually recognized by the user.

Graph 71 corresponds to a moving-picture blur waveform when the moving picture is displayed at 60 Hz, and graph 72 corresponds to a moving-picture blur waveform when the moving picture is driven at double speed and displayed at 120 Hz. As depicted in FIG. 17, the width of the edge of the luminance levels included in graph 72 is smaller than the width of the edge of the luminance levels included in graph 71. As described above, since the display device 1 can suppress the degree of the moving-picture blur occurring at the edge when the moving picture is displayed at 120 Hz, the moving picture display quality can be improved.

Figure 18:
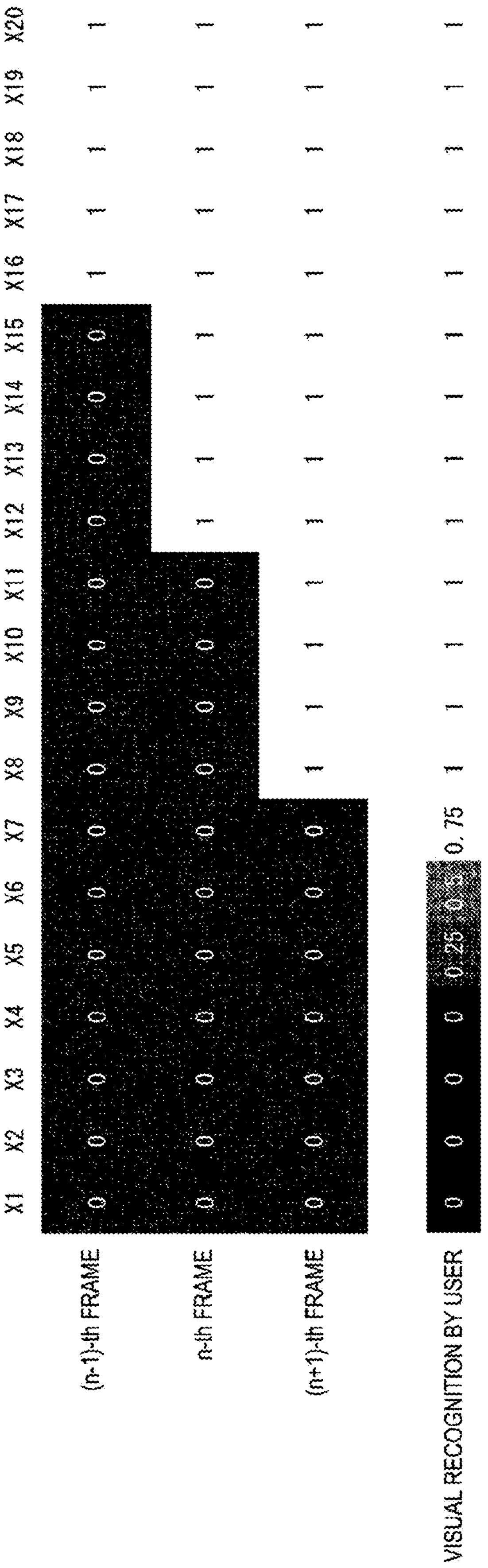
FIG. 18 is a diagram depicting actual luminance levels of pixels in images of three frames constituting input image data (moving picture) and luminance levels of pixels visually recognized by a user when the image is displayed without double-speed driving in an embodiment of the disclosure.

FIG. 18 is a diagram depicting actual luminance levels of pixels in images of three frames constituting input image data (moving picture) and luminance levels of pixels visually recognized by a user when the image is displayed without double-speed driving in an embodiment of the disclosure. Hereinafter, an example in which the image data converter 2 processes an image having luminance levels depicted in FIG. 18 will be described. In the example of FIG. 18, there is an edge between a region where the luminance level 0 continues and a region where the luminance level 1 continues in the image. The position of the edge is the same as the position of the edge at gray luminance levels depicted in FIG. 6.

Figure 19:
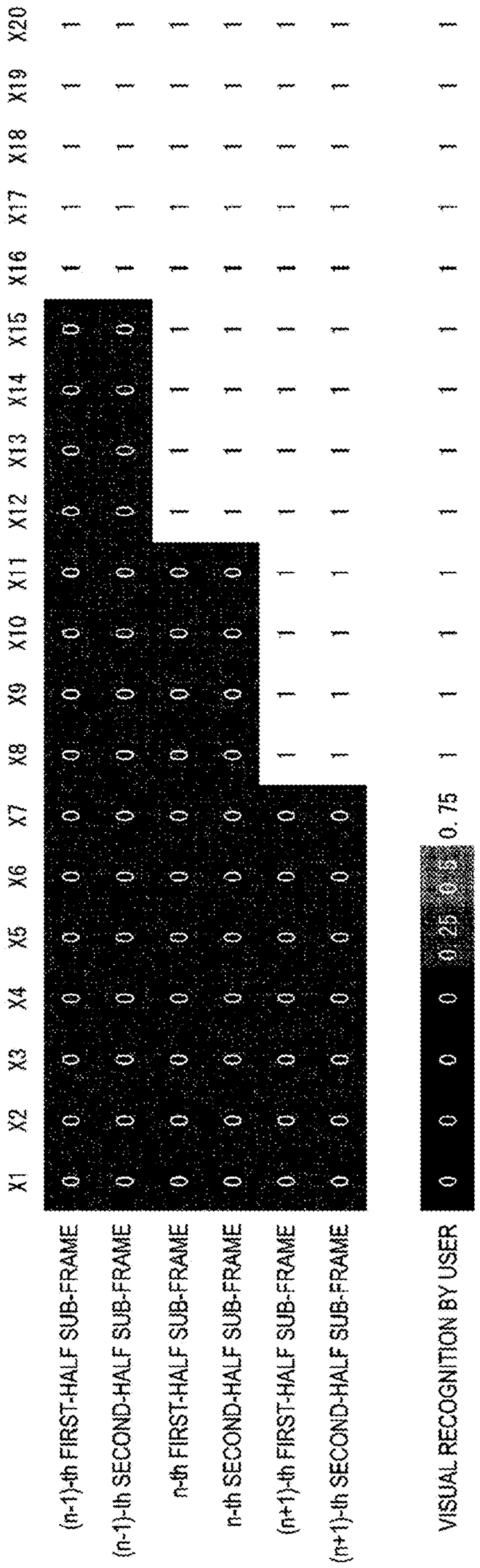
FIG. 19 is a diagram depicting actual luminance levels of pixels in images of six sub-frames constituting display data after conversion and luminance levels of pixels visually recognized by a user when the image is driven at double speed and displayed in an embodiment of the disclosure.

FIG. 19 is a diagram depicting actual luminance levels of pixels in images of six sub-frames constituting display data after conversion and luminance levels of pixels visually recognized by a user when the image is driven at double speed and displayed in an embodiment of the disclosure. The image data converter 2 converts the luminance level of each pixel depicted in FIG. 18 into the image of each sub-frame depicted in FIG. 19 by the method described above. The values of the first-half sub-frame coefficient Pf and the second-half sub-frame coefficient Ps of the pixels determined by the above processing are the same as those depicted in FIG. 7.

As depicted in FIG. 12, regardless of the values of the first-half sub-frame coefficient Pf and the second-half sub-frame coefficient Ps, the output luminance level corresponding to a minimum input luminance level in the conversion data for the n-th first-half sub-frame is the same as the output luminance level corresponding to a minimum input luminance level in the conversion data for the second-half sub-frame. In addition, the output luminance level corresponding to a maximum input luminance level in the conversion data for the first-half sub-frame is the same as the output luminance level corresponding to a maximum input luminance level in the conversion data for the n-th second-half sub-frame.

In this case, the minimum luminance level is 0 and the maximum luminance level is 1. That is, as depicted in FIG. 12, regardless of the values of the first-half sub-frame coefficient Pf and the second-half sub-frame coefficient Ps, in all of graph 41 to graph 43 and graph 51 to graph 53, the minimum input luminance level "0" corresponds to the minimum output luminance level "0", and the maximum input luminance level "1" corresponds to the maximum output luminance level "1". Accordingly, regardless of the value of the first-half sub-frame coefficient Pf, when the luminance level of a pixel in the n-th frame is 0, the first-half sub-frame luminance determination unit 16 determines 0 as the luminance level of the pixel in the n-th first-half sub-frame. When the luminance level of a pixel in the n-th frame is 1, the value of 1 is determined to be the luminance level of the pixel in the n-th first-half sub-frame. Likewise, regardless of the value of the second-half sub-frame coefficient Ps, when the luminance level of a pixel in the n-th frame is 0, the second-half sub-frame luminance determination unit 18 determines 0 as the luminance level of the pixel in the n-th second-half sub-frame. When the luminance level of a pixel in the n-th frame is 1, the value of 1 is determined to be the luminance level of the pixel in the n-th second-half sub-frame. The same applies to other frames. Thus, as for the luminance levels of the pixels depicted in FIG. 19, the luminance level of each pixel in all of the first-half sub-frames and second-half sub-frames is the same as the luminance level of the corresponding pixel in the corresponding frame. As a result, the display device 1 displays the same image as the image of the n-th frame on the OLED panel 22 in each of the n-th first-half sub-frame and the n-th second-half sub-frame, for example.

Figure 20:
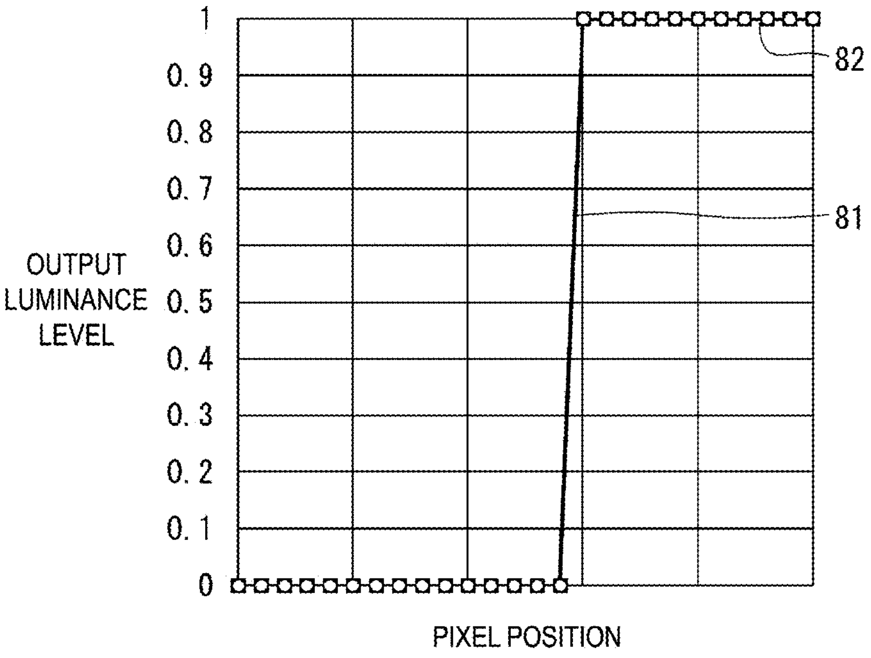
FIG. 20 is a diagram depicting a distribution of luminance levels of pixels in an L-th row of an n-th first-half sub-frame and a distribution of luminance levels of pixels in an L-th row of an n-th second-half sub-frame.

FIG. 20 is a diagram depicting a distribution of luminance levels of pixels in an L-th row of the n-th first-half sub-frame and a distribution of luminance levels of pixels in an L-th row of the n-th second-half sub-frame. In FIG. 20, graph 81 depicts the distribution of luminance levels of pixels in the L-th row of the n-th first-half sub-frame depicted in FIG. 19. Graph 82 depicts the distribution of luminance levels of pixels in the L-th row of the n-th second-half sub-frame depicted in FIG. 19. In FIG. 20, the horizontal axis represents the position of each pixel in the L-th row, and the vertical axis represents the output luminance level after conversion.

As depicted in FIG. 20, the luminance level of each pixel in the n-th first-half sub-frame is the same as the luminance level of the same pixel in the n-th second-half sub-frame for any pixel. Therefore, when an image is driven at double speed and displayed as depicted in FIG. 19, no flicker occurs in the entire image. As described above, in the display device 1, when a moving picture having an edge between the minimum luminance level and the maximum luminance level is driven at double speed and displayed, it is possible to prevent deterioration in display quality of the moving picture.

Figure 21:
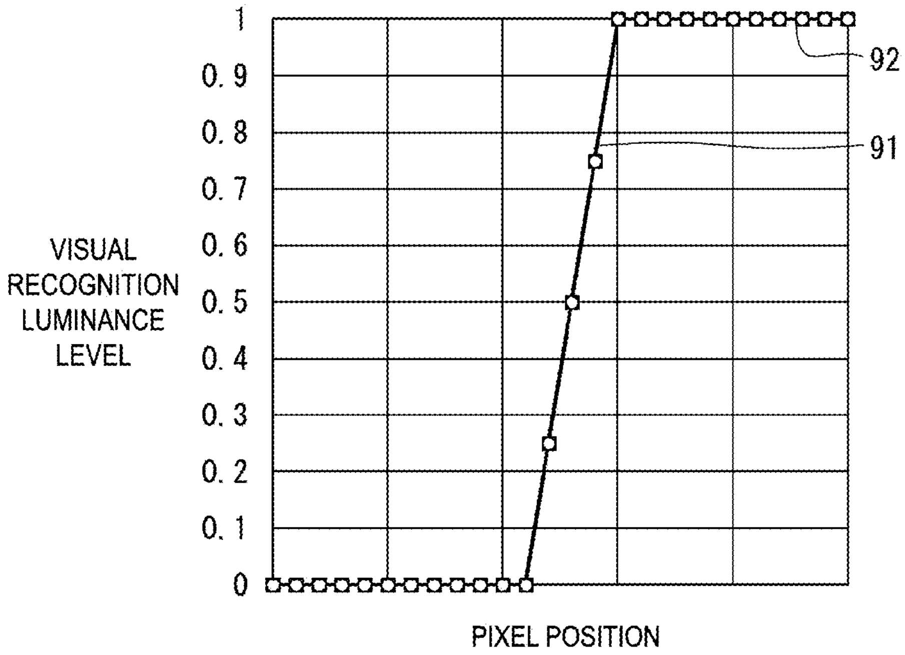
FIG. 21 is a diagram depicting a moving-picture blur waveform visually recognized by a user.

FIG. 21 is a diagram depicting a moving-picture blur waveform visually recognized by a user. Graph 91 is a graph depicting a distribution of luminance levels actually visually recognized by the user when the moving picture is displayed at 60 Hz as depicted in FIG. 18. Graph 92 is a graph depicting a distribution of luminance levels actually visually recognized by the user when the moving picture is driven at double speed and displayed at 120 Hz as depicted in FIG. 19. In FIG. 21, the horizontal axis represents the position of each pixel in the L-th row of the image, and the vertical axis represents the luminance level actually recognized by the user.

Graph 91 corresponds to a moving-picture blur waveform when the moving picture is displayed at 60 Hz, and graph 92 corresponds to a moving-picture blur waveform when the moving picture is driven at double speed and displayed at 120 Hz. As depicted in FIG. 21, the width of the edge of the luminance levels included in graph 92 is the same as the width of the edge of the luminance levels included in graph 91. As described above, when a moving picture having an edge between the minimum luminance level and the maximum luminance level is displayed at 120 Hz, the display device 1 can prevent the degree of the moving-picture blur occurring at the edge from worsening.

Modified Example

In the display device 1, the conversion data for determining the luminance levels for the first-half sub-frame and the conversion data for determining the luminance levels for the second-half sub-frame may be interchanged. In the present modified example, when the input luminance level is taken as In and the output luminance level is taken as Fn, the conversion data for the n-th first-half sub-frames is defined as follows:

$$\begin{aligned} Fn &= \mathrm{In} \times Pf + \mathrm{In} \text{ (when In is 0.5 or less)} \\ Fn &= (1 - \mathrm{In}) \times Pf + \mathrm{In} \text{ (when In is greater than 0.5)} \end{aligned}.$$

Further, when the input luminance level is taken as In and the output luminance level is taken as Sn, the conversion data for the n-th second-half sub-frames is defined as follows:

$$\begin{aligned} Sn &= (-1 \times \mathrm{In}) \times Ps + \mathrm{In} \text{ (when In is 0.5 or less)} \\ Sn &= (\mathrm{In} - 1) \times Ps + \mathrm{In} \text{ (when In is greater than 0.5)} \end{aligned}.$$

In the present example, graph 51 to graph 53 illustrated in FIG. 12 depict the correspondence between the input luminance levels and the output luminance levels in the conversion data for determining the luminance levels of the first-half sub-frame. Graph 41 to graph 43 illustrated in FIG. 12 depict the correspondence between the input luminance levels and the output luminance levels in the conversion data for determining the luminance levels of the second-half sub-frame.

In the present example as well, it holds that as the first-half sub-frame coefficient Pf and the second-half sub-frame coefficient Ps each having the same value are larger, the difference between the output luminance level corresponding to the input luminance level in the conversion data for the n-th first-half sub-frame and the output luminance level corresponding to the same input luminance level in the second conversion data for the n-th second-half sub-frame is larger. However, in the present example, in a range where the input luminance level is larger than 0 and smaller than 1, the output luminance level corresponding to the input luminance level in the conversion data for the n-th first-half sub-frame is larger than the output luminance level corresponding to the same input luminance level in the conversion data for the n-th second-half sub-frame.

FIG. 22 is a diagram depicting actual luminance levels of pixels in images of six sub-frames constituting display data after conversion and luminance levels of pixels visually recognized by the user when the image is driven at double speed and displayed in the modified example of the disclosure. The image data converter 2 converts the luminance level of each pixel depicted in FIG. 6 into the image of each sub-frame depicted in FIG. 22 by the method of the present modified example. At this time, the values of the first-half sub-frame coefficient Pf and the second-half sub-frame coefficient Ps of the pixels determined halfway are the same as those depicted in FIG. 7.

Figure 23:
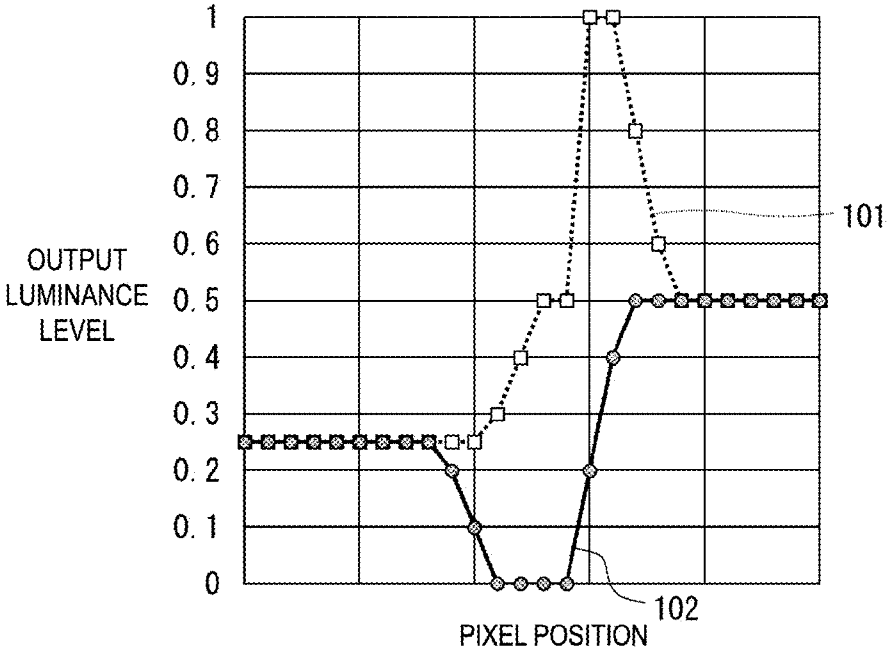
FIG. 23 is a diagram depicting a distribution of luminance levels of pixels in an L-th row of an n-th first-half sub-frame and a distribution of luminance levels of pixels in an L-th row of an n-th second-half sub-frame.

FIG. 23 is a diagram depicting a distribution of luminance levels of pixels in an L-th row of the n-th first-half sub-frame and a distribution of luminance levels of pixels in an L-th row of the n-th second-half sub-frame. In FIG. 23, graph 101 depicts a distribution of luminance levels of the pixels in the L-th row of the n-th first-half sub-frame depicted in FIG. 22. Graph 102 depicts a distribution of luminance levels of the pixels in the L-th row of the n-th second-half sub-frame depicted in FIG. 22. In FIG. 23, the horizontal axis represents the position of each pixel in the L-th row, and the vertical axis represents the output luminance level after conversion.

As depicted in FIG. 22 and graph 101 of FIG. 23, the luminance levels F12(n) to F15(n) of the pixels X12 to X15 in the n-th first-half sub-frame are all 0.5 or more. That is, in the image of the n-th first-half sub-frame, the luminance level at the position of the edge present near the pixel X12 is more emphasized. Further, as depicted in FIG. 22 and graph 102 of FIG. 23, the luminance levels S8(n) to S11(n) of the pixels X8 to X11 in the n-th second-half sub-frame are all 0. That is, in the image of the n-th second-half sub-frame, black display is inserted at the position of the edge present near the pixel X12.

As depicted in FIG. 22 and graph 101 and graph 102 of FIG. 23, in a region away from the edge, the luminance level of the n-th first-half sub-frame and the luminance level of the n-th second-half sub-frame at the same pixel position have the same value. For example, in a region on the left side of the edge, the luminance level is 0.25 in both the n-th first-half sub-frame and the n-th second-half sub-frame. In a region on the right side of the edge, the luminance level is 0.5 in both the n-th first-half sub-frame and the n-th second-half sub-frame. As described above, the insertion position of the black display in the n-th second-half sub-frame is limited to the position at which the edge is present.

Accordingly, in the present example as well, since the display device 1 can display the edge more sharply by inserting the black display, the display quality of moving pictures can be improved. Furthermore, since the black display is inserted only in the vicinity of the edge, even if a flicker occurs in the moving picture displayed at 120 Hz, the occurrence position of the flicker is limited to the vicinity of the edge where the black display is inserted. As a result, the occurrence position of the flicker in the moving picture may be confined in a minimum range, and therefore the degradation in display quality of the moving picture may be prevented in a region other than the edge.

Figure 24:
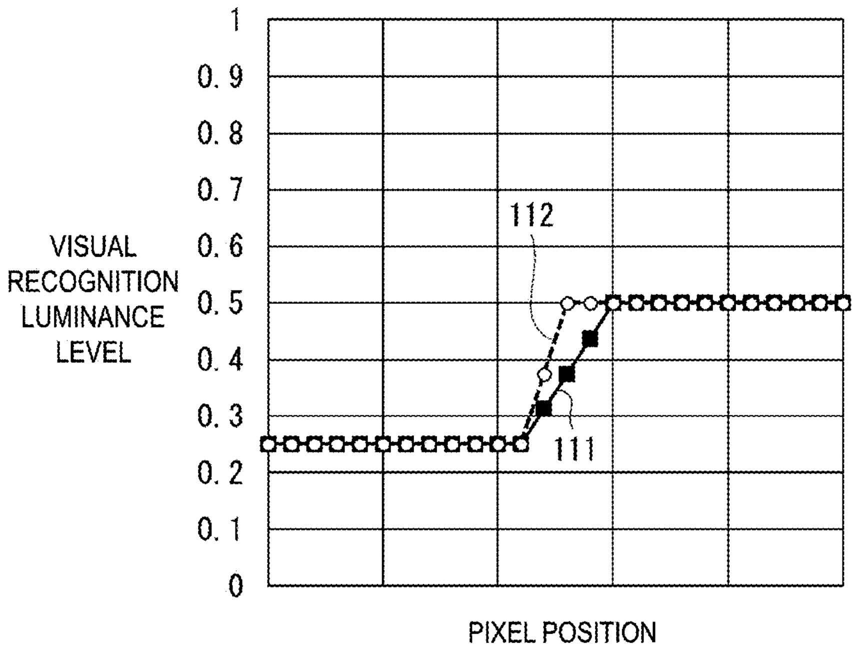
FIG. 24 is a diagram depicting a moving-picture blur waveform visually recognized by a user.

FIG. 24 is a diagram depicting a moving-picture blur waveform visually recognized by the user. Graph 111 is a graph depicting a distribution of luminance levels actually visually recognized by the user when a moving picture is displayed at 60 Hz as depicted in FIG. 15. Graph 112 is a graph depicting a distribution of luminance levels actually visually recognized by the user when the moving picture is driven at double speed and displayed at 120 Hz as depicted in FIG. 23. In FIG. 24, the horizontal axis represents the position of each pixel in the L-th row of the image, and the vertical axis represents the luminance level actually recognized by the user.

Graph 111 corresponds to a moving-picture blur waveform when the moving picture is displayed at 60 Hz, and graph 112 corresponds to a moving-picture blur waveform when the moving picture is driven at double speed and displayed at 120 Hz. As depicted in FIG. 24, the width of the edge of the luminance levels included in graph 112 is smaller than the width of the edge of the luminance levels included in graph 111. As described above, in the present example as well, since the display device 1 can suppress the degree of the moving-picture blur occurring at the edge when the moving picture is displayed at 120 Hz, the moving picture display quality can be improved.

Another Modified Example

In the present embodiment, for convenience of description, an example has been described in which, among the pixels in the periphery of a pixel of interest, only the pixels arranged in the periphery in the same row as that of the pixel of interest are specified as peripheral pixels. However, the disclosure is not limited thereto, and the display device 1 may also specify the pixels arranged in the periphery of the pixel of interest in the vertical direction and the diagonal direction as peripheral pixels. To be specific, when the pixel of interest is superimposed on the center A55 of the filter 31 in the L-th row of the image of the n-th frame, the frame memory controller 14 may specify all of a total of 80 pixels respectively superimposed on the filter values other than the A55 in the filter 31 as the peripheral pixels. With this, the frame memory controller 14 can specify, as the peripheral pixels, pixels arranged in the periphery of the pixel of interest in the horizontal direction, vertical direction, and diagonal direction. Further, when the pixel of interest is superimposed on the center B33 of the filter 32 in the L-th row of the image of the n-th frame, the line memory controller 13 may specify all of a total of 24 pixels respectively superimposed on the filter values other than the B33 in the filter 32 as the peripheral pixels. This makes it possible for the line memory controller 13 to specify, as the peripheral pixels, pixels arranged in the periphery of the pixel of interest in the horizontal direction, vertical direction, and diagonal direction.

The shapes of the filters 31 and 32 may be any planar shape other than a square. Specifically, the filters 31 and 32 may be filters having any planar shape in which a plurality of filter values are arranged in a planar form. Examples of such shapes include a rectangle, circle, and elliptical.

The filter 31 may take any size other than the size of nine rows and nine columns. Each filter value included in the filter 31 may be any value other than the filter values depicted in FIG. 8. The filter 32 may take any size other than the size of five rows and five columns. Each filter value included in the filter 32 may be any value other than the filter values depicted in FIG. 9.

The gray scale luminance converter 11 and the luminance gray scale converter 6 are not necessarily required in the display device 1. That is, the image data converter 2 may determine the gray scale levels of pixels of the image in the n-th first-half sub-frame and the gray scale levels of pixels of the image in the n-th second-half sub-frame based on the gray scale levels of pixels of the image in the n-th frame. In the present example, the conversion data for the n-th first-half sub-frame and the conversion data for the n-th second-half sub-frame need to be implemented as a conversion table in which the correspondence between the input gray scale levels and the output gray scale levels is defined in consideration of the gamma characteristics of the OLED panel 22.

The display device 1 may include any display panel other than the OLED panel 22 capable of high-speed response. For example, the display device 1 may include a display panel having a response speed lower than that of the OLED panel 22. In this case, it is desirable to appropriately adjust the correspondence between the input luminance levels and the output luminance levels in the conversion data depicted in FIG. 12 in accordance with the response speed of the display panel included in the display device 1.

Supplement A display device according to a first aspect of the disclosure is a display device configured to divide one frame into a first-half sub-frame and a second-half sub-frame and display an image in each of the first-half sub-frame and the second-half sub-frame, the display device including:

a pixel-of-interest specifying unit configured to specify, as a pixel of interest, any one of a plurality of pixels constituting an image of the one frame;

a first peripheral pixel specifying unit configured to specify a plurality of first peripheral pixels disposed in a periphery of the pixel of interest in the image;

a first difference coefficient determination unit configured to determine a plurality of first difference coefficients based on differences between each pixel value of the pixel of interest and the plurality of first peripheral pixels in the image of the one frame and a pixel value of the pixel of interest in the image of the one frame;

a first coefficient determination unit configured to determine a first coefficient by performing an arithmetic operation using a first filter on each of the plurality of first difference coefficients;

a first pixel value determination unit configured to determine a pixel value of the pixel of interest in an image of the first-half sub-frame based on first conversion data defining correspondence between an input pixel value and the first coefficient, and an output pixel value;

a second peripheral pixel specifying unit configured to specify a plurality of second peripheral pixels disposed in the periphery of the pixel of interest in the image mentioned above;

a second difference coefficient determination unit configured to determine a plurality of second difference coefficients based on differences between each pixel value of the pixel of interest and the plurality of second peripheral pixels in an image of a frame subsequent to the one frame, and each pixel value of the pixel of interest and the plurality of second peripheral pixels in the image of the one frame;

a second coefficient determination unit configured to determine a second coefficient by performing an arithmetic operation using a second filter on each of the plurality of second difference coefficients; and a second pixel value determination unit configured to determine a pixel value of the pixel of interest in an image of the second-half sub-frame based on second conversion data defining a relationship between an input pixel value and the second coefficient, and an output pixel value, wherein as the first coefficient and the second coefficient equal to each other are larger, a difference between the output pixel value corresponding to the input pixel value in the first conversion data and the output pixel value corresponding to the identical input pixel value in the second conversion data is larger.

A display device according to a second aspect of the disclosure may be configured such that, in the above-described first aspect, the first filter has a plurality of first filter values arranged two-dimensionally; in a case where the first filter value located at a center of the first filter is superimposed on the pixel of interest, the first peripheral pixel specifying unit specifies, as the first peripheral pixels, a plurality of pixels superimposed on the first filter values in a periphery of the center of the first filter; the second filter has a plurality of second filter values arranged two-dimensionally; and in a case where the second filter value located at a center of the second filter is superimposed on the pixel of interest, the second peripheral pixel specifying unit specifies, as the second peripheral pixels, a plurality of pixels superimposed on the second filter values in a periphery of the center of the second filter.

A display device according to a third aspect of the disclosure may be configured such that, in the above-described second aspect, a size of the first filter is larger than a size of the second filter.

A display device according to a fourth aspect of the disclosure may be configured such that, in the above-described first aspect, regardless of values of the first coefficient and the second coefficient, the output pixel value corresponding to the minimum input pixel value in the first conversion data is identical to the output pixel value corresponding to the minimum input pixel value in the second conversion data, and the output pixel value corresponding to the maximum input pixel value in the first conversion data is identical to the output pixel value corresponding to the maximum input pixel value in the second conversion data.

The disclosure is not limited to each of the embodiments described above, and various modifications may be implemented within a range not departing from the scope of the claims. Embodiments obtained by appropriately combining technical approaches stated in each of the different embodiments also fall within the scope of the technology of the disclosure. Novel technical features may also be formed by combining the technical approaches stated in each of the embodiments.

The invention claimed is:

1. A display device configured to divide one frame into a first-half sub-frame and a second-half sub-frame and display an image in each of the first-half sub-frame and the second-half sub-frame, the display device comprising:

a pixel-of-interest specifying unit configured to specify, as a pixel of interest, any one of a plurality of pixels constituting an image of the one frame;

a first peripheral pixel specifying unit configured to specify a plurality of first peripheral pixels disposed in a periphery of the pixel of interest in the image;

a first difference coefficient determination unit configured to determine a plurality of first difference coefficients based on differences between each pixel value of the pixel of interest and the plurality of first peripheral pixels in the image of the one frame and a pixel value of the pixel of interest in the image of the one frame;

a first coefficient determination unit configured to determine a first coefficient by performing an arithmetic operation using a first filter on each of the plurality of first difference coefficients;

a first pixel value determination unit configured to determine a pixel value of the pixel of interest in an image of the first-half sub-frame based on first conversion data defining correspondence between an input pixel value and the first coefficient, and an output pixel value;

a second peripheral pixel specifying unit configured to specify a plurality of second peripheral pixels disposed in the periphery of the pixel of interest in the image mentioned above;

a second difference coefficient determination unit configured to determine a plurality of second difference coefficients based on differences between each pixel value of the pixel of interest and the plurality of second peripheral pixels in an image of a frame subsequent to the one frame, and each pixel value of the pixel of interest and the plurality of second peripheral pixels in the image of the one frame;

a second coefficient determination unit configured to determine a second coefficient by performing an arithmetic operation using a second filter on each of the plurality of second difference coefficients; and a second pixel value determination unit configured to determine a pixel value of the pixel of interest in an image of the second-half sub-frame based on second conversion data defining correspondence between an input pixel value and the second coefficient, and an output pixel value, wherein, as the first coefficient and the second coefficient equal to each other are larger, a difference between the output pixel value corresponding to the input pixel value in the first conversion data and the output pixel value corresponding to the identical input pixel value in the second conversion data is larger.

2. The display device according to claim 1, wherein the first filter has a plurality of first filter values arranged two-dimensionally, in a case where the first filter value located at a center of the first filter is superimposed on the pixel of interest, the first peripheral pixel specifying unit specifies, as the first peripheral pixels, a plurality of pixels superimposed on the first filter values in a periphery of the center of the first filter, the second filter has a plurality of second filter values arranged two-dimensionally, and in a case where the second filter value located at a center of the second filter is superimposed on the pixel of interest, the second peripheral pixel specifying unit specifies, as the second peripheral pixels, a plurality of pixels superimposed on the second filter values in a periphery of the center of the second filter.

3. The display device according to claim 2, wherein a size of the first filter is larger than a size of the second filter.

4. The display device according to claim 1, wherein the output pixel value corresponding to the input pixel value in the second conversion data is larger than the output pixel value corresponding to the identical input pixel value in the first conversion data.

5. The display device according to claim 1, wherein regardless of values of the first coefficient and the second coefficient, the output pixel value corresponding to the minimum input pixel value in the first conversion data is identical to the output pixel value corresponding to the minimum input pixel value in the second conversion data, and the output pixel value corresponding to the maximum input pixel value in the first conversion data is identical to the output pixel value corresponding to the maximum input pixel value in the second conversion data.

* * * * *